(12) United States Patent
Matsunaga et al.

(10) Patent No.: US 7,888,438 B2
(45) Date of Patent: Feb. 15, 2011

(54) CATALYST FOR OLEFIN POLYMERIZATION AND PROCESS FOR OLEFIN POLYMERIZATION

(75) Inventors: Kazuhisa Matsunaga, Otake (JP); Hisao Hashida, Iwakuni (JP); Toshiyuki Tsutsui, Otake (JP); Kunio Yamamoto, Yamaguchi (JP); Atsushi Shibahara, Chiba (JP); Tetsunori Shinozaki, Otake (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 703 days.

(21) Appl. No.: 11/878,739

(22) Filed: Jul. 26, 2007

(65) Prior Publication Data

US 2008/0125555 A1 May 29, 2008

Related U.S. Application Data

(63) Continuation-in-part of application No. 11/795,504, filed as application No. PCT/JP2006/300773 on Jan. 19, 2006, application No. 11/878,739, and a continuation-in-part of application No. 11/795,505, filed as application No. PCT/JP2006/300774 on Jan. 19, 2006.

(30) Foreign Application Priority Data

| Jan. 19, 2005 | (JP) | ............................. 2005-011512 |
| Jan. 19, 2005 | (JP) | ............................. 2005-011513 |
| Jan. 19, 2005 | (JP) | ............................. 2005-011514 |

(51) Int. Cl.
C08F 4/42 (2006.01)

(52) U.S. Cl. .................. 526/124.3; 526/142; 526/124.2; 526/348; 502/103; 502/127; 502/132; 502/133

(58) Field of Classification Search .............. 526/124.2, 526/124.3, 142, 348; 502/103, 127, 132, 502/133
See application file for complete search history.

(56) References Cited

U.S. PATENT DOCUMENTS

| 4,725,656 A | * | 2/1988 | Kashiwa et al. ........... 526/125.3 |
| 6,194,342 B1 | | 2/2001 | Parodi et al. |
| 6,284,917 B1 | | 9/2001 | Brunner et al. |
| 2004/0259721 A1 | | 12/2004 | Matsunaga et al. |
| 2008/0097050 A1 | | 4/2008 | Matsunaga et al. |
| 2008/0306228 A1 | | 12/2008 | Matsunaga et al. |
| 2009/0069515 A1 | | 3/2009 | Matsunaga et al. |

FOREIGN PATENT DOCUMENTS

| JP | 57-063310 A | | 4/1982 |
| JP | 03-007703 A | | 1/1991 |
| JP | 05-170843 A | | 7/1993 |
| JP | 06-122716 A | | 5/1994 |
| JP | 2001-114811 | * | 4/2001 |
| JP | 2001-114811 A | | 4/2001 |
| JP | 2003-040918 A | | 2/2003 |
| JP | 2003-0409918 | * | 2/2003 |
| WO | WO 00/63261 A1 | | 10/2000 |
| WO | WO 01/57099 A1 | | 8/2001 |
| WO | WO 02/30998 A1 | | 4/2002 |

* cited by examiner

*Primary Examiner*—Ling-Siu Choi
(74) *Attorney, Agent, or Firm*—Buchanan Ingersoll & Rooney PC

(57) ABSTRACT

A catalyst for olefin polymerization of the present invention includes a solid titanium catalyst component (I) including titanium, magnesium, halogen, and a cyclic ester compound (a) represented by the following formula (1):

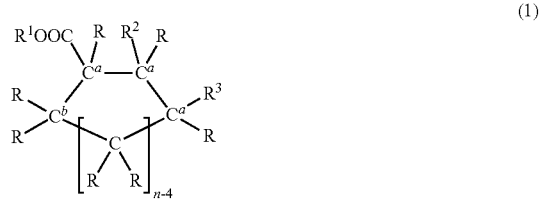

(1)

wherein n is an integer of 5 to 10; $R^2$ and $R^3$ are each independently $COOR^1$ or R, and at least one of $R^2$ and $R^3$ is $COOR^1$; a single bond (excluding $C^a$—$C^a$ bonds, and a $C^a$—$C^b$ bond in the case where $R^3$ is R) in the cyclic backbone may be replaced with a double bond; a plurality of $R^1$'s are each independently a monovalent hydrocarbon group having 1 to 20 carbon atoms; and a plurality of R's are each independently a hydrogen atom or a substituent, but at least one of R's is a hydrogen atom, and an organometal compound catalyst component (II). When this catalyst for olefin polymerization is used, an olefin polymer having a broad molecular weight distribution can be produced.

15 Claims, No Drawings

CATALYST FOR OLEFIN POLYMERIZATION AND PROCESS FOR OLEFIN POLYMERIZATION

CROSS-REFERENCE TO RELATED APPLICATIONS

This application is a continuation-in-part of application Ser. No. 11/795,504, filed Mar. 12, 2008, which was the National Stage filing under §371 of PCT/JP2006/300773, filed Jan. 19, 2006, and of application Ser. No. 11/795,505, filed Mar. 12, 2008, which was the National Stage filing under §371 of PCT/JP2006/300774, filed Jan. 19, 2006, which in turn claim priority to Japanese Application Nos. 2005-011512, 2005-011513 and 2005-011514, each of which was filed on Jan. 19, 2005, the content of each of which are incorporated herein by reference.

TECHNICAL FIELD

The present invention relates to a solid titanium catalyst component, to a catalyst for olefin polymerization containing an organometal compound catalyst component, and to a process for olefin polymerization using the catalyst for olefin polymerization.

BACKGROUND OF THE INVENTION

As the catalysts for producing an olefin polymer such as a homopolymer of ethylene or an α-olefin, and a copolymer of ethylene and an α-olefin, the catalysts containing a titanium compound supported on magnesium halide in the active state have been conventionally known (hereinafter, the term "polymerization" may be described to encompass both of "homopolymerization" and "copolymerization").

As the catalyst for olefin polymerization, a catalyst containing titanium tetrachloride or titanium trichloride, which is called a Ziegler-Natta catalyst, a catalyst composed of a solid titanium catalyst component comprising magnesium, titanium, halogen and an electron donor, and an organometallic compound, and the like have been widely known.

The latter catalyst exhibits high activity in the polymerization of α-olefins such as propylene and butene-1, in addition to ethylene. Also, the obtained α-olefin polymer may have high stereoregularity.

It is reported that when among these catalysts, in particular, a catalyst comprising a solid titanium catalyst component having an electron donor, supported thereon, selected from carboxylic acid esters, typically exemplified by phthalic acid esters, and as a co-catalyst component, an aluminum-alkyl compound, and a silicon compound having at least one Si—OR (wherein R is a hydrocarbon group) is used, excellent polymerization activity and stereospecificity are exhibited in JP-A No. 57-63310 (Patent Document 1), etc.

The obtained polymers obtained by using the above-described catalyst often have narrower molecular weight distributions, as compared with the polymers obtained by using a Ziegler-Natta catalyst. It is known that the polymers having narrow molecular weight distributions tend to have "low melt flowability", "low melt tension", "poor moldability", "slightly low rigidity", or the like. On the other hand, from the standpoints of improvement of productivity, reduction in cost, or the like, various high speed molding technologies such as, for example, high speed stretching technologies aimed at improvement of productivity of the stretched film, have evolved.

When the polymers having relatively narrow molecular weight distributions as described above are to be stretched at a high speed, for example, the neck-in or flapping of the films may become more remarkable due to shortage of melt tension, and thus it becomes difficult to improve the productivity. Therefore, the polymers having higher melt tensions are demanded by the market.

In order to solve these problems, there have been many reports on a method for broadening the molecular weight distributions of the polymers by producing the polymers having different molecular weights by means of a multi-stage polymerization (JP-A No. 5-170843 (Patent Document 2)), a catalyst comprising plural kinds of electron donors (JP-A No. 3-7703 (Patent Document 3)), a catalyst using a succinic acid ester having an asymmetric carbon as the electron donor contained in the solid titanium catalyst component (pamphlet of International Publication WO 01/057099 (Patent Document 4), pamphlet of International Publication WO 00/63261 (Patent Document 5), pamphlet of International Publication WO 02/30998 (Patent Document 6)), and the like.

On the other hand, JP-A No. 2001-114811 (Patent Document 7) and JP-A No. 2003-40918 (Patent Document 8) disclose a solid catalyst component for olefin(s) polymerization, which is obtained by bringing into contact with a titanium compound, a magnesium compound and an electron-donating compound, and a catalyst for olefin(s) polymerization comprising the catalyst component. As the electron-donating compound, 1,2-cyclohexanedicarboxylic acid esters having a purity of the trans-isomers of 80% or more are used in the invention as described in Patent Document 7; and cyclohexenedicarboxylic acid diesters are used in the invention as described in Patent Document 8. As the specific example of these cyclohexenedicarboxylic acid diesters, 1-cyclohexenedicarboxylic acid diester only is disclosed, in which the alkoxycarbonyl group is bonded to the 1-position and the 2-position of the cyclohexene ring of 1-cyclohexene (paragraphs [0021] to [0024], and Examples). However, Patent Documents 7 and 8 have no description on the molecular weight distributions of the olefin polymers.

[Patent Document 1] JP-A No. 57-63310
[Patent Document 2] JP-A No. 5-170843
[Patent Document 3] JP-A No. 3-7703
[Patent Document 4] Pamphlet of International Publication WO 01/057099
[Patent Document 5] Pamphlet of International Publication WO 00/63261
[Patent Document 6] Pamphlet of International Publication WO 02/30998
[Patent Document 7] JP-A No. 2001-114811
[Patent Document 8] JP-A No. 2003-40918

DISCLOSURE OF THE INVENTION

Problems to be Solved by the Invention

However, the above-described catalyst has been the catalysts which have an insufficient effect of broadening the molecular weight distribution of the olefin polymer, and according to the investigation conducted by the present inventors, broaden the molecular weight distribution by increasing the content of the low molecular weight components. On the other hand, as evaluated from the market, it cannot be said that the catalysts provide sufficient improvement of the melt tension of the olefin polymer. Further, from the viewpoint of reduction in the cost, appearance of a catalyst which makes it possible to produce an olefin polymer having a molecular weight distribution broadened by means of a simpler process is demanded by the market.

Therefore, it is an object of the present invention to provide a catalyst and a process for olefin polymerization which are capable of conveniently producing an olefin polymer having a broad molecular weight distribution and a high melt tension, and being suitable for high speed stretch and high speed molding.

Means for Solving the Problems

The present inventors have made extensive studies, and as a result, they found that a catalyst for olefin polymerization comprising a solid titanium catalyst component, which contains a specific cyclic ester compound having a plurality of carboxylic acid ester groups, and an organometal compound catalyst component at a specific ratio is capable of producing an olefin polymer having a broad molecular weight distribution, thus completing the invention.

The catalyst for olefin polymerization of the invention is characterized in that it comprises:

a solid titanium catalyst component (I) comprising titanium, magnesium, halogen, and a cyclic ester compound (a) specified by the following formula (1):

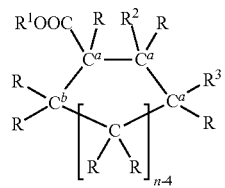

(1)

wherein n is an integer of 5 to 10, $R^2$ and $R^3$ are each independently $COOR^1$ or R, and at least one of $R^2$ and $R^3$ is $COOR^1$;

a single bond (excluding $C^a$—$C^a$ bonds, and a $C^a$—$C^b$ bond in the case where $R^3$ is R) in the cyclic backbone may be replaced with a double bond;

a plurality of $R^1$'s are each independently a monovalent hydrocarbon group having 1 to 20 carbon atoms;

a plurality of $R^1$'s are each independently an atom or group selected from a hydrogen atom, a hydrocarbon group having 1 to 20 carbon atoms, a halogen atom, a nitrogen-containing group, an oxygen-containing group, a phosphorus-containing group, a halogen-containing group and a silicon-containing group, and they may be bonded to each other to form a ring; and a double bond may be contained in the backbone of the ring formed by the bonding of R's, and in the case where two or more $C^a$'s bonded with $COOR^1$ are contained in the backbone of the ring, the backbone of the ring have 5 to 10 carbon atoms, and an organometallic compound catalyst component (II) containing a metal element selected from Groups I, II and XIII of the periodic table, wherein the amount of the metal (M-2) (mol) in the organometallic compound catalyst component (II) and the amount of titanium (M-Ti) (mol) in the solid titanium catalyst component (I) satisfies the following relationship:

$350 \geq (M\text{-}2)/(M\text{-}Ti) \geq 10$.

In the formula (1), it is preferable that the bonds between the carbon atoms in the cyclic backbone are all single bonds.

In the formula (1), it is preferable that the cyclic backbone has 6 carbon atoms.

As the above-described cyclic ester compound (a), the compound represented by the following formula (1a) is preferable:

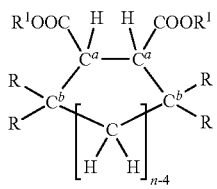

(1a)

wherein n is an integer of 5 to 10;

a single bond (excluding $C^a$—$C^a$ bonds and $C^a$—$C^b$ bonds) in the cyclic backbone may be replaced with a double bond;

a plurality of $R^1$'s are each independently a monovalent hydrocarbon group having 1 to 20 carbon atoms;

a plurality of R's are each independently an atom or group selected from a hydrogen atom, a hydrocarbon group having 1 to 20 carbon atoms, a halogen atom, a nitrogen-containing group, an oxygen-containing group, a phosphorus-containing group, a halogen-containing group and a silicon-containing group, or they may be bonded to each other to form a ring; and a double bond may be contained in the backbone of the ring formed by the bonding of R's, and in the case where two $C^a$'s are contained in the backbone of the ring, the backbone of the ring have 5 to 10 carbon atoms.

The solid titanium catalyst component (I) of the invention may further comprise an aromatic carboxylic acid ester and/or a compound having two or more ether linkages through a plurality of carbon atoms.

The catalyst for olefin polymerization of the invention may further comprise an electron donor (III).

The process for olefin polymerization of the invention is characterized in that it comprises polymerizing an olefin in the presence of the catalyst for olefin polymerization.

The molded product of the invention is obtained by molding the olefin polymer produced by the process for polymerization.

EFFECTS OF THE INVENTION

The catalyst for olefin polymerization and the process for olefin polymerization of the invention are suitable for producing an olefin polymer having high stereoregularity and broad molecular weight distribution with high activity.

Further, when the catalyst for olefin polymerization and the process for olefin polymerization of the invention are used, it can be expected that an olefin polymer, for example, having excellent rigidity, as well as the molding properties such as high speed stretchability and high speed moldability can be prepared.

BEST MODE FOR CARRYING OUT THE INVENTION

Hereinbelow, the catalyst for olefin polymerization and the process for olefin polymerization according to the invention will be described in detail.

Catalyst for Olefin Polymerization

Solid Titanium Catalyst Component (I)

The solid titanium catalyst component (I) used in the invention is characterized in that it comprises titanium, magnesium, halogen, and a cyclic ester compound (a).

<Cyclic Ester Compound (a)>
The above-described cyclic ester compound (a) is represented by the following formula (1):

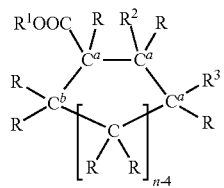

In the formula (1), n is an integer of 5 to 10, preferably an integer of 5 to 7, and particularly preferably 6. Further, $C^a$ and $C^b$ represent carbon atoms.

$R^2$ and $R^3$ are each independently $COOR^1$ or R, and at least one of $R^2$ and $R^3$ is $COOR^1$.

It is preferable that the bonds between the carbon atoms in the cyclic backbone are all single bonds, but any of single bonds excluding $C^a$—$C^a$ bonds, and a $C^a$—$C^b$ bond in the case where $R^3$ is R, in the cyclic backbone may be replaced with double bonds.

A plurality of $R^1$'s are each independently a monovalent hydrocarbon group having 1 to 20 carbon atoms, preferably 1 to 10 carbon atoms, more preferably 2 to 8 carbon atoms, even more preferably 4 to 8 carbon atoms, and particularly preferably 4 to 6 carbon atoms. Examples of these hydrocarbon groups include an ethyl group, an n-propyl group, an isopropyl group, an n-butyl group, an isobutyl group, a hexyl group, a heptyl group, an octyl group, a 2-ethylhexyl group, a decyl group, a dodecyl group, a tetradecyl group, a hexadecyl group, an octadecyl group, an eicosyl group, and the like; and among them, preferred are an n-butyl group, an isobutyl group, a hexyl group and an octyl group, and more preferred are an n-butyl group and an isobutyl group.

A plurality of R's are each independently an atom or group selected from a hydrogen atom, a hydrocarbon group having 1 to 20 carbon atoms, a halogen atom, a nitrogen-containing group, an oxygen-containing group, a phosphorus-containing group, a halogen-containing group and a silicon-containing group.

Among them, a hydrogen atom and a hydrocarbon group having 1 to 20 carbon atoms is preferred as the R, and examples of this hydrocarbon group having 1 to 20 carbon atoms include aliphatic, alicyclic or aromatic hydrocarbons such as a methyl group, an ethyl group, an n-propyl group, an isopropyl group, an n-butyl group, an isobutyl group, a sec-butyl group, an n-pentyl group, a cyclopentyl group, an n-hexyl group, a cyclohexyl group, a vinyl group, a phenyl group and an octyl group. Among them, preferred is an aliphatic hydrocarbon group, and specifically preferred are a methyl group, an ethyl group, an n-propyl group, an isopropyl group, an n-butyl group, an isobutyl group and a sec-butyl group.

Further, R's may be bonded to each other to form a ring, and a double bond may be contained in the backbone of the ring formed by the bonding of R's. In the case where two or more $C^a$'s bonded with $COOR^1$ are contained in the backbone of the ring, the backbone of the ring have 5 to 10 carbon atoms.

Examples of the backbone of the ring include a norbornane backbone, a tetracyclododecene backbone, or the like.

Further, a plurality of R's may be a carbonyl structure-containing group such as a carboxylic acid ester group, an alkoxy group, a siloxy group, an aldehyde group and an acetyl group, and it is preferable that these substituents contain one or more hydrocarbon groups.

Examples of the cyclic ester compound (a) include
diethyl cyclohexane-1,2-dicarboxylate,
di-n-propyl cyclohexane-1,2-dicarboxylate,
diisopropyl cyclohexane-1,2-dicarboxylate,
di-n-butyl cyclohexane-1,2-dicarboxylate,
diisobutyl cyclohexane-1,2-dicarboxylate,
dihexyl cyclohexane-1,2-dicarboxylate,
diheptyl cyclohexane-1,2-dicarboxylate,
dioctyl cyclohexane-1,2-dicarboxylate,
di-2-ethylhexyl cyclohexane-1,2-dicarboxylate,
didecyl cyclohexane-1,2-dicarboxylate,
diethyl cyclohexane-1,3-dicarboxylate,
diisobutyl cyclohexane-1,3-dicarboxylate,
diethyl cyclopentane-1,2-dicarboxylate,
diisopropyl cyclopentane-1,2-dicarboxylate,
diisobutyl cyclopentane-1,2-dicarboxylate,
diheptyl cyclopentane-1,2-dicarboxylate,
didecyl cyclopentane-1,2-dicarboxylate,
diethyl cyclopentane-1,3-dicarboxylate,
diisobutyl cyclopentane-1,3-dicarboxylate,
diethyl cycloheptane-1,2-dicarboxylate,
diisopropyl cycloheptane-1,2-dicarboxylate,
diisobutyl cycloheptane-1,2-dicarboxylate,
diheptyl cycloheptane-1,2-dicarboxylate,
didecyl cycloheptane-1,2-dicarboxylate,
diethyl cycloheptane-1,3-dicarboxylate,
diisobutyl cycloheptane-1,3-dicarboxylate,
diethyl cyclooctane-1,2-dicarboxylate,
diethyl cyclodecane-1,2-dicarboxylate,
diethyl 4-cyclohexene-1,2-dicarboxylate,
di-n-propyl 4-cyclohexene-1,2-dicarboxylate,
diisopropyl 4-cyclohexene-1,2-dicarboxylate,
di-n-butyl 4-cyclohexene-1,2-dicarboxylate,
diisobutyl 4-cyclohexene-1,2-dicarboxylate,
dihexyl 4-cyclohexene-1,2-dicarboxylate,
diheptyl 4-cyclohexene-1,2-dicarboxylate,
dioctyl 4-cyclohexene-1,2-dicarboxylate,
didecyl 4-cyclohexene-1,2-dicarboxylate,
diethyl 4-cyclohexene-1,3-dicarboxylate,
diisobutyl 4-cyclohexene-1,3-dicarboxylate,
diethyl 3-cyclopentene-1,2-dicarboxylate,
diisopropyl 3-cyclopentene-1,2-dicarboxylate,
diisobutyl 3-cyclopentene-1,2-dicarboxylate,
diheptyl 3-cyclopentene-1,2-dicarboxylate,
didecyl 3-cyclopentene-1,2-dicarboxylate,
diethyl 3-cyclopentene-1,3-dicarboxylate,
diisobutyl 3-cyclopentene-1,3-dicarboxylate,
diethyl 4-cycloheptene-1,2-dicarboxylate,
diisopropyl 4-cycloheptene-1,2-dicarboxylate,
diisobutyl 4-cycloheptene-1,2-dicarboxylate,
diheptyl 4-cycloheptene-1,2-dicarboxylate,
didecyl 4-cycloheptene-1,2-dicarboxylate,
diethyl 4-cycloheptene-1,3-dicarboxylate,
diisobutyl 4-cycloheptene-1,3-dicarboxylate,
diethyl 5-cyclooctene-1,2-dicarboxylate,
diethyl 6-cyclodecene-1,2-dicarboxylate,
diethyl 3-methylcyclohexane-1,2-dicarboxylate,
di-n-propyl 3-methylcyclohexane-1,2-dicarboxylate,
diisopropyl 3-methylcyclohexane-1,2-dicarboxylate,
di-n-butyl 3-methylcyclohexane-1,2-dicarboxylate,
diisobutyl 3-methylcyclohexane-1,2-dicarboxylate,
dihexyl 3-methylcyclohexane-1,2-dicarboxylate,
diheptyl 3-methylcyclohexane-1,2-dicarboxylate,
dioctyl 3-methylcyclohexane-1,2-dicarboxylate, 2-ethylhexyl 3-methylcyclohexane-1,2-dicarboxylate,
didecyl 3-methylcyclohexane-1,2-dicarboxylate,
diethyl 4-methylcyclohexane-1,3-dicarboxylate,
diisobutyl 4-methylcyclohexane-1,3-dicarboxylate,
diethyl 4-methylcyclohexane-1,2-dicarboxylate,
di-n-propyl 4-methylcyclohexane-1,2-dicarboxylate,
diisopropyl 4-methylcyclohexane-1,2-dicarboxylate,
di-n-butyl 4-methylcyclohexane-1,2-dicarboxylate,
diisobutyl 4-methylcyclohexane-1,2-dicarboxylate,
dihexyl 4-methylcyclohexane-1,2-dicarboxylate,
diheptyl 4-methylcyclohexane-1,2-dicarboxylate,
dioctyl 4-methylcyclohexane-1,2-dicarboxylate,
di-2-ethylhexyl 4-methylcyclohexane-1,2-dicarboxylate,
didecyl 4-methylcyclohexane-1,2-dicarboxylate,
diethyl 5-methylcyclohexane-1,3-dicarboxylate,
diisobutyl 5-methylcyclohexane-1,3-dicarboxylate,
diethyl 3,4-dimethylcyclohexane-1,2-dicarboxylate,
di-n-propyl 3,4-dimethylcyclohexane-1,2-dicarboxylate,
diisopropyl 3,4-dimethylcyclohexane-1,2-dicarboxylate,
di-n-butyl 3,4-dimethylcyclohexane-1,2-dicarboxylate,
diisobutyl 3,4-dimethylcyclohexane-1,2-dicarboxylate,
dihexyl 3,4-dimethylcyclohexane-1,2-dicarboxylate,
diheptyl 3,4-dimethylcyclohexane-1,2-dicarboxylate,
dioctyl 3,4-dimethylcyclohexane-1,2-dicarboxylate,
di-2-ethylhexyl 3,4-dimethylcyclohexane-1,2-dicarboxylate,
didecyl 3,4-dimethylcyclohexane-1,2-dicarboxylate,
diethyl 3,6-dimethylcyclohexane-1,2-dicarboxylate,
di-n-propyl 3,6-dimethylcyclohexane-1,2-dicarboxylate,
diisopropyl 3,6-dimethylcyclohexane-1,2-dicarboxylate,
di-n-butyl 3,6-dimethylcyclohexane-1,2-dicarboxylate,
diisobutyl 3,6-dimethylcyclohexane-1,2-dicarboxylate,
dihexyl 3,6-dimethylcyclohexane-1,2-dicarboxylate,
diheptyl 3,6-dimethylcyclohexane-1,2-dicarboxylate,
dioctyl 3,6-dimethylcyclohexane-1,2-dicarboxylate,
di-2-ethylhexyl 3,6-dimethylcyclohexane-1,2-dicarboxylate,
didecyl 3,6-dimethylcyclohexane-1,2-dicarboxylate,
diethyl 3,6-diphenylcyclohexane-1,2-dicarboxylate,
di-n-propyl 3,6-diphenylcyclohexane-1,2-dicarboxylate,
diisopropyl 3,6-diphenylcyclohexane-1,2-dicarboxylate,
di-n-butyl 3,6-diphenylcyclohexane-1,2-dicarboxylate,
diisobutyl 3,6-diphenylcyclohexane-1,2-dicarboxylate,
dihexyl 3,6-diphenylcyclohexane-1,2-dicarboxylate,
dioctyl 3,6-diphenylcyclohexane-1,2-dicarboxylate,
didecyl 3,6-diphenylcyclohexane-1,2-dicarboxylate,
diethyl 3-methyl-6-ethylcyclohexane-1,2-dicarboxylate,
di-n-propyl 3-methyl-6-ethylcyclohexane-1,2-dicarboxylate,
diisopropyl 3-methyl-6-ethylcyclohexane-1,2-dicarboxylate,
di-n-butyl 3-methyl-6-ethylcyclohexane-1,2-dicarboxylate,
diisobutyl 3-methyl-6-ethylcyclohexane-1,2-dicarboxylate,
dihexyl 3-methyl-6-ethylcyclohexane-1,2-dicarboxylate,
diheptyl 3-methyl-6-ethylcyclohexane-1,2-dicarboxylate,
dioctyl 3-methyl-6-ethylcyclohexane-1,2-dicarboxylate,
di-2-ethylhexyl 3-methyl-6-ethylcyclohexane-1,2-dicarboxylate,
didecyl 3-methyl-6-ethylcyclohexane-1,2-dicarboxylate,
diethyl 3-methyl-6-ethylcyclohexane-1,2-dicarboxylate,
di-n-propyl 3-methyl-6-ethylcyclohexane-1,2-dicarboxylate,
diisopropyl 3-methyl-6-ethylcyclohexane-1,2-dicarboxylate,
di-n-butyl 3-methyl-6-ethylcyclohexane-1,2-dicarboxylate,
diisobutyl 3-methyl-6-ethylcyclohexane-1,2-dicarboxylate,
dihexyl 3-methyl-6-ethylcyclohexane-1,2-dicarboxylate,
diheptyl 3-methyl-6-ethylcyclohexane-1,2-dicarboxylate,
dioctyl 3-methyl-6-ethylcyclohexane-1,2-dicarboxylate,
di-2-ethylhexyl 3-methyl-6-ethylcyclohexane-1,2-dicarboxylate,
didecyl 3-methyl-6-ethylcyclohexane-1,2-dicarboxylate,
diethyl 3-methyl-6-n-propylcyclohexane-1,2-dicarboxylate,
di-n-propyl 3-methyl-6-n-propylcyclohexane-1,2-dicarboxylate,
diisopropyl 3-methyl-6-n-propylcyclohexane-1,2-dicarboxylate,
di-n-butyl 3-methyl-6-n-propylcyclohexane-1,2-dicarboxylate,
diisobutyl 3-methyl-6-n-propylcyclohexane-1,2-dicarboxylate,
dihexyl 3-methyl-6-n-propylcyclohexane-1,2-dicarboxylate,
diheptyl 3-methyl-6-n-propylcyclohexane-1,2-dicarboxylate,
dioctyl 3-methyl-6-n-propylcyclohexane-1,2-dicarboxylate,
di-2-ethylhexyl 3-methyl-6-n-propylcyclohexane-1,2-dicarboxylate,
didecyl 3-methyl-6-n-propylcyclohexane-1,2-dicarboxylate,
diethyl 3-hexylcyclohexane-1,2-dicarboxylate,
diisobutyl 3-hexylcyclohexane-1,2-dicarboxylate,
diethyl 3,6-dihexylcyclohexane-1,2-dicarboxylate,
diisobutyl 3-hexyl-6-pentylcyclohexane-1,2-dicarboxylate,
diethyl 3-methylcyclopentane-1,2-dicarboxylate,
diisobutyl 3-methylcyclopentane-1,2-dicarboxylate,
diheptyl 3-methylcyclopentane-1,2-dicarboxylate,
didecyl 3-methylcyclopentane-1,2-dicarboxylate,
diethyl 4-methylcyclopentane-1,3-dicarboxylate,
diisobutyl 4-methylcyclopentane-1,3-dicarboxylate,
diethyl 4-methylcyclopentane-1,2-dicarboxylate,
diisobutyl 4-methylcyclopentane-1,2-dicarboxylate,
diheptyl 4-methylcyclopentane-1,2-dicarboxylate,
didecyl 4-methylcyclopentane-1,2-dicarboxylate,
diethyl 5-methylcyclopentane-1,3-dicarboxylate,
diisobutyl 5-methylcyclopentane-1,3-dicarboxylate,
diethyl 3,4-dimethylcyclopentane-1,2-dicarboxylate,
diisobutyl 3,4-dimethylcyclopentane-1,2-dicarboxylate,
diheptyl 3,4-dimethylcyclopentane-1,2-dicarboxylate,
didecyl 3,4-dimethylcyclopentane-1,2-dicarboxylate,
diethyl 3,5-dimethylcyclopentane-1,2-dicarboxylate,
diisobutyl 3,5-dimethylcyclopentane-1,2-dicarboxylate,
diheptyl 3,5-dimethylcyclopentane-1,2-dicarboxylate,
didecyl 3,5-dimethylcyclopentane-1,2-dicarboxylate,
diethyl 3-hexylcyclopentane-1,2-dicarboxylate,
diethyl 3,5-dihexylcyclopentane-1,2-dicarboxylate,
diisobutyl 3-hexyl-5-pentylcyclopentane-1,2-dicarboxylate,
diethyl 3-methyl-5-n-propylcyclopentane-1,2-dicarboxylate,
di-n-propyl 3-methyl-5-n-propylcyclopentane-1,2-dicarboxylate,
diisopropyl 3-methyl-5-n-propylcyclopentane-1,2-dicarboxylate,
di-n-butyl 3-methyl-5-n-propylcyclopentane-1,2-dicarboxylate,
diisobutyl 3-methyl-5-n-propylcyclopentane-1,2-dicarboxylate,
dihexyl 3-methyl-5-n-propylcyclopentane-1,2-dicarboxylate,
dioctyl 3-methyl-5-n-propylcyclopentane-1,2-dicarboxylate,
didecyl 3-methyl-5-n-propylcyclopentane-1,2-dicarboxylate,
diethyl 3-methylcycloheptane-1,2-dicarboxylate,
diisobutyl 3-methylcycloheptane-1,2-dicarboxylate,
diheptyl 3-methylcycloheptane-1,2-dicarboxylate,
didecyl 3-methylcycloheptane-1,2-dicarboxylate,
diethyl 4-methylcycloheptane-1,3-dicarboxylate, diisobutyl 4-methylcycloheptane-1,3-dicarboxylate,
diethyl 4-methylcycloheptane-1,2-dicarboxylate,
diisobutyl 4-methylcycloheptane-1,2-dicarboxylate,
diheptyl 4-methylcycloheptane-1,2-dicarboxylate,
didecyl 4-methylcycloheptane-1,2-dicarboxylate,
diethyl 5-methylcycloheptane-1,3-dicarboxylate,
diisobutyl 5-methylcycloheptane-1,3-dicarboxylate,
diethyl 3,4-dimethylcycloheptane-1,2-dicarboxylate,
diisobutyl 3,4-dimethylcycloheptane-1,2-dicarboxylate,
diheptyl 3,4-dimethylcycloheptane-1,2-dicarboxylate,
didecyl 3,4-dimethylcycloheptane-1,2-dicarboxylate,
diethyl 3,7-dimethylcycloheptane-1,2-dicarboxylate,
diisobutyl 3,7-dimethylcycloheptane-1,2-dicarboxylate,
diheptyl 3,7-dimethylcycloheptane-1,2-dicarboxylate,
didecyl 3,7-dimethylcycloheptane-1,2-dicarboxylate,
diethyl 3-hexylcycloheptane-1,2-dicarboxylate,
diethyl 3,7-dihexylcycloheptane-1,2-dicarboxylate,
diisobutyl 3-hexyl-7-pentylcycloheptane-1,2-dicarboxylate,
diethyl 3-methyl-7-n-propylcycloheptane-1,2-dicarboxylate,
di-n-propyl 3-methyl-7-n-propylcycloheptane-1,2-dicarboxylate,
diisopropyl 3-methyl-7-n-propylcycloheptane-1,2-dicarboxylate,
di-n-butyl 3-methyl-7-n-propylcycloheptane-1,2-dicarboxylate,
diisobutyl 3-methyl-7-n-propylcycloheptane-1,2-dicarboxylate,
dihexyl 3-methyl-7-n-propylcycloheptane-1,2-dicarboxylate,
dioctyl 3-methyl-7-n-propylcycloheptane-1,2-dicarboxylate,
didecyl 3-methyl-7-n-propylcycloheptane-1,2-dicarboxylate,
diethyl 3-methylcyclooctane-1,2-dicarboxylate,
diethyl 3-methylcyclodecane-1,2-dicarboxylate,
isobutyl 3-vinylcyclohexane-1,2-dicarboxylate,
isobutyl 3,6-diphenylcyclohexane-1,2-dicarboxylate,
ethyl 3,6-dicyclohexylcyclohexane-1,2-dicarboxylate,
diisobutyl norbornane-2,3-dicarboxylate,
diisobutyl tetracyclododecane-2,3-dicarboxylate,
diethyl 3-methyl-4-cyclohexene-1,2-dicarboxylate,
di-n-propyl 3-methyl-4-cyclohexene-1,2-dicarboxylate,
diisopropyl 3-methyl-4-cyclohexene-1,2-dicarboxylate,
di-n-butyl 3-methyl-4-cyclohexene-1,2-dicarboxylate,
diisobutyl 3-methyl-4-cyclohexene-1,2-dicarboxylate,
dihexyl 3-methyl-4-cyclohexane-1,2-dicarboxylate,
diheptyl 3-methyl-4-cyclohexene-1,2-dicarboxylate,
dioctyl 3-methyl-4-cyclohexene-1,2-dicarboxylate,
di-2-ethylhexyl 3-methyl-4-cyclohexene-1,2-dicarboxylate,
didecyl 3-methyl-4-cyclohexene-1,2-dicarboxylate,
diethyl 4-methyl-4-cyclohexene-1,3-dicarboxylate,
diisobutyl 4-methyl-4-cyclohexene-1,3-dicarboxylate,
diethyl 4-methyl-4-cyclohexene-1,2-dicarboxylate,
di-n-propyl 4-methyl-4-cyclohexene-1,2-dicarboxylate,
diisopropyl 4-methyl-4-cyclohexene-1,2-dicarboxylate,
di-n-butyl 4-methyl-4-cyclohexene-1,2-dicarboxylate,
diisobutyl 4-methyl-4-cyclohexene-1,2-dicarboxylate,
dihexyl 4-methyl-4-cyclohexene-1,2-dicarboxylate,
diheptyl 4-methyl-4-cyclohexene-1,2-dicarboxylate,
dioctyl 4-methyl-4-cyclohexene-1,2-dicarboxylate,
di-2-ethylhexyl 4-methyl-4-cyclohexene-1,2-dicarboxylate,
didecyl 4-methyl-4-cyclohexene-1,2-dicarboxylate,
diethyl 5-methyl-4-cyclohexene-1,3-dicarboxylate,
diisobutyl 5-methyl-4-cyclohexene-1,3-dicarboxylate,
diethyl 3,4-dimethyl-4-cyclohexene-1,2-dicarboxylate,
di-n-propyl 3,4-dimethyl-4-cyclohexene-1,2-dicarboxylate,
diisopropyl 3,4-dimethyl-4-cyclohexene-1,2-dicarboxylate,
di-n-butyl 3,4-dimethyl-4-cyclohexene-1,2-dicarboxylate,
diisobutyl 3,4-dimethyl-4-cyclohexene-1,2-dicarboxylate,
dihexyl 3,4-dimethyl-4-cyclohexene-1,2-dicarboxylate,
diheptyl 3,4-dimethyl-4-cyclohexene-1,2-dicarboxylate,
dioctyl 3,4-dimethyl-4-cyclohexene-1,2-dicarboxylate,
di-2-ethylhexyl 3,4-dimethyl-4-cyclohexene-1,2-dicarboxylate,
didecyl 3,4-dimethyl-4-cyclohexene-1,2-dicarboxylate,
diethyl 3,6-dimethyl-4-cyclohexene-1,2-dicarboxylate,
di-n-propyl 3,6-dimethyl-4-cyclohexene-1,2-dicarboxylate,
diisopropyl 3,6-dimethyl-4-cyclohexene-1,2-dicarboxylate,
di-n-butyl 3,6-dimethyl-4-cyclohexene-1,2-dicarboxylate,
diisobutyl 3,6-dimethyl-4-cyclohexene-1,2-dicarboxylate,
dihexyl 3,6-dimethyl-4-cyclohexene-1,2-dicarboxylate,
diheptyl 3,6-dimethyl-4-cyclohexene-1,2-dicarboxylate,
dioctyl 3,6-dimethyl-4-cyclohexene-1,2-dicarboxylate,
di-2-ethylhexyl 3,6-dimethyl-4-cyclohexene-1,2-dicarboxylate,
didecyl 3,6-dimethyl-4-cyclohexene-1,2-dicarboxylate,
diethyl 3-hexyl-4-cyclohexene-1,2-dicarboxylate,
diisobutyl 3-hexyl-4-cyclohexene-1,2-dicarboxylate,
diethyl 3,6-dihexyl-4-cyclohexene-1,2-dicarboxylate,
diisobutyl 3-hexyl-6-pentyl-4-cyclohexene-1,2-dicarboxylate,
diethyl 3-methyl-3-cyclopentene-1,2-dicarboxylate,
diisobutyl 3-methyl-3-cyclopentene-1,2-dicarboxylate,
diheptyl 3-methyl-3-cyclopentene-1,2-dicarboxylate,
didecyl 3-methyl-3-cyclopentene-1,2-dicarboxylate,
diethyl 4-methyl-3-cyclopentene-1,3-dicarboxylate,
diisobutyl 4-methyl-3-cyclopentene-1,3-dicarboxylate,
diethyl 4-methyl-3-cyclopentene-1,2-dicarboxylate,
diisobutyl 4-methyl-3-cyclopentene-1,2-dicarboxylate,
diheptyl 4-methyl-3-cyclopentene-1,2-dicarboxylate,
didecyl 4-methyl-3-cyclopentene-1,2-dicarboxylate,
diethyl 5-methyl-3-cyclopentene-1,3-dicarboxylate,
diisobutyl 5-methyl-3-cyclopentene-1,3-dicarboxylate,
diethyl 3,4-dimethyl-3-cyclopentene-1,2-dicarboxylate,
diisobutyl 3,4-dimethyl-3-cyclopentene-1,2-dicarboxylate,
diheptyl 3,4-dimethyl-3-cyclopentene-1,2-dicarboxylate,
didecyl 3,4-dimethyl-3-cyclopentene-1,2-dicarboxylate,
diethyl 3,5-dimethyl-3-cyclopentene-1,2-dicarboxylate,
diisobutyl 3,5-dimethyl-3-cyclopentene-1,2-dicarboxylate,
diheptyl 3,5-dimethyl-3-cyclopentene-1,2-dicarboxylate,
didecyl 3,5-dimethyl-3-cyclopentene-1,2-dicarboxylate,
diethyl 3-hexyl-3-cyclopentene-1,2-dicarboxylate,
diethyl 3,5-dihexyl-3-cyclopentene-1,2-dicarboxylate,
diisobutyl 3-hexyl-5-pentyl-3-cyclopentene-1,2-dicarboxylate,
diethyl 3-methyl-4-cycloheptene-1,2-dicarboxylate,
diisobutyl 3-methyl-4-cycloheptene-1,2-dicarboxylate,
diheptyl 3-methyl-4-cycloheptene-1,2-dicarboxylate,
didecyl 3-methyl-4-cycloheptene-1,2-dicarboxylate,
diethyl 4-methyl-4-cycloheptene-1,3-dicarboxylate,
diisobutyl 4-methyl-4-cycloheptene-1,3-dicarboxylate,
diethyl 4-methyl-4-cycloheptene-1,2-dicarboxylate,
diisobutyl 4-methyl-4-cycloheptene-1,2-dicarboxylate,
diheptyl 4-methyl-4-cycloheptene-1,2-dicarboxylate,
didecyl 4-methyl-4-cycloheptene-1,2-dicarboxylate,
diethyl 5-methyl-4-cycloheptene-1,3-dicarboxylate,
diisobutyl 5-methyl-4-cycloheptene-1,3-dicarboxylate,
diethyl 3,4-dimethyl-4-cycloheptene-1,2-dicarboxylate,
diisobutyl 3,4-dimethyl-4-cycloheptene-1,2-dicarboxylate,
diheptyl 3,4-dimethyl-4-cycloheptene-1,2-dicarboxylate,
didecyl 3,4-dimethyl-4-cycloheptene-1,2-dicarboxylate,
diethyl 3,7-dimethyl-4-cycloheptene-1,2-dicarboxylate,
diisobutyl 3,7-dimethyl-4-cycloheptene-1,2-dicarboxylate,
diheptyl 3,7-dimethyl-4-cycloheptene-1,2-dicarboxylate,
didecyl 3,7-dimethyl-4-cycloheptene-1,2-dicarboxylate, diethyl 3-hexyl-4-cycloheptene-1,2-dicarboxylate,
diethyl 3,7-dihexyl-4-cycloheptene-1,2-dicarboxylate,
diisobutyl 3-hexyl-7-pentyl-4-cycloheptene-1,2-dicarboxylate,
diethyl 3-methyl-5-cyclooctene-1,2-dicarboxylate,
diethyl 3-methyl-6-cyclodecene-1,2-dicarboxylate,
diisobutyl 3-vinyl-4-cyclohexene-1,2-dicarboxylate,
diisobutyl 3,6-diphenyl-4-cyclohexene-1,2-dicarboxylate,
diethyl 3,6-dicyclohexyl-4-cyclohexene-1,2-dicarboxylate,
diisobutyl 2-norbornene-5,6-dicarboxylate,
diisobutyl 2-tetracyclododecene-7,8-dicarboxylate, and the like.

The compounds having the diester structure as described above may exist in the form of a cis- or trans-isomer derived from a plurality of the COOR$^1$ groups in the formula (1), either of which has effects complying with the purpose of the invention, but the compounds having higher content of the trans-isomers are preferred. The compounds having higher content of the trans-isomers have the effects of broadening the molecular weight distribution, as well as tend to have higher activity, and higher stereoregularity of the obtained polymer.

As the above-described cyclic ester compound (a), the compound represented by the following formulas (1a) is preferable.

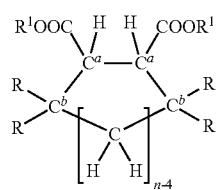
(1a)

wherein n, R$^1$ and R have the same meanings as above (that is, the same as the definitions in the formula (1)), and a single bond (excluding C$^a$—C$^a$ bonds and C$^a$—C$^b$ bonds) in the cyclic backbone may be replaced with a double bond.

Specific examples of the compounds represented by the formula (1a) include
diethyl cyclohexane-1,2-dicarboxylate,
di-n-propyl cyclohexane-1,2-dicarboxylate,
diisopropyl cyclohexane-1,2-dicarboxylate,
di-n-butyl cyclohexane-1,2-dicarboxylate,
diisobutyl cyclohexane-1,2-dicarboxylate,
dihexyl cyclohexane-1,2-dicarboxylate,
diheptyl cyclohexane-1,2-dicarboxylate,
dioctyl cyclohexane-1,2-dicarboxylate,
2-ethylhexyl cyclohexane-1,2-dicarboxylate,
didecyl cyclohexane-1,2-dicarboxylate,
diethyl cyclopentane-1,2-dicarboxylate,
diisopropyl cyclopentane-1,2-dicarboxylate,
diisobutyl cyclopentane-1,2-dicarboxylate,
diheptyl cyclopentane-1,2-dicarboxylate,
didecyl cyclopentane-1,2-dicarboxylate,
diethyl cycloheptane-1,2-dicarboxylate,
diisopropyl cycloheptane-1,2-dicarboxylate,
diisobutyl cycloheptane-1,2-dicarboxylate,
diheptyl cycloheptane-1,2-dicarboxylate,
didecyl cycloheptane-1,2-dicarboxylate,
diisobutyl 3,6-dimethylcyclohexane-1,2-dicarboxylate,
di-n-hexyl 3,6-dimethylcyclohexane-1,2-dicarboxylate,
di-n-octyl 3,6-dimethylcyclohexane-1,2-dicarboxylate,
diisobutyl 3-methyl-6-ethylcyclohexane-1,2-dicarboxylate,
di-n-hexyl 3-methyl-6-ethylcyclohexane-1,2-dicarboxylate,
di-n-octyl 3-methyl-6-ethylcyclohexane-1,2-dicarboxylate,
diisobutyl 3-methyl-6-n-propylcyclohexane-1,2-dicarboxylate, di-n-hexyl
3-methyl-6-n-propylcyclohexane-1,2-dicarboxylate, di-n-octyl
3-methyl-6-n-propylcyclohexane-1,2-dicarboxylate,
diisobutyl 3,6-diethylcyclohexane-1,2-dicarboxylate,
di-n-hexyl 3,6-diethylcyclohexane-1,2-dicarboxylate,
di-n-octyl 3,6-diethylcyclohexane-1,2-dicarboxylate,
diisobutyl 3,5-dimethylcyclopentane-1,2-dicarboxylate,
di-n-hexyl 3,5-dimethylcyclopentane-1,2-dicarboxylate,
di-n-octyl 3,5-dimethylcyclopentane-1,2-dicarboxylate,
diisobutyl 3-methyl-5-ethylcyclopentane-1,2-dicarboxylate,
di-n-hexyl 3-methyl-5-ethylcyclopentane-1,2-dicarboxylate,
di-n-octyl 3-methyl-5-ethylcyclopentane-1,2-dicarboxylate,
di-n-hexyl 3-methyl-5-n-propylcyclopentane-1,2-dicarboxylate,
di-n-octyl 3-methyl-5-n-propylcyclopentane-1,2-dicarboxylate,
diisobutyl 3,5-diethylcyclopentane-1,2-dicarboxylate,
di-n-hexyl 3,5-diethylcyclopentane-1,2-dicarboxylate,
di-n-octyl 3,5-diethylcyclopentane-1,2-dicarboxylate,
diisobutyl 3,7-dimethylcycloheptane-1,2-dicarboxylate,
di-n-hexyl 3,7-dimethylcycloheptane-1,2-dicarboxylate,
di-n-octyl 3,7-dimethylcycloheptane-1,2-dicarboxylate,
diisobutyl 3-methyl-7-ethylcycloheptane-1,2-dicarboxylate,
di-n-hexyl 3-methyl-7-ethylcycloheptane-1,2-dicarboxylate,
di-n-octyl 3-methyl-7-ethylcycloheptane-1,2-dicarboxylate,
di-n-hexyl 3-methyl-7-n-propylcycloheptane-1,2-dicarboxylate,
di-n-octyl 3-methyl-7-n-propylcycloheptane-1,2-dicarboxylate,
diisobutyl 3,7-diethylcycloheptane-1,2-dicarboxylate,
di-n-hexyl 3,7-diethylcycloheptane-1,2-dicarboxylate,
di-n-octyl 3,7-diethylcycloheptane-1,2-dicarboxylate, and the like.

Among these compounds, more preferred are diethyl cyclohexane-1,2-dicarboxylate,
di-n-propyl cyclohexane-1,2-dicarboxylate,
diisopropyl cyclohexane-1,2-dicarboxylate,
di-n-butyl cyclohexane-1,2-dicarboxylate,
diisobutyl cyclohexane-1,2-dicarboxylate,
dihexyl cyclohexane-1,2-dicarboxylate,
diheptyl cyclohexane-1,2-dicarboxylate,
dioctyl cyclohexane-1,2-dicarboxylate,
2-ethylhexyl cyclohexane-1,2-dicarboxylate,
didecyl cyclohexane-1,2-dicarboxylate,
diisobutyl 3,6-dimethylcyclohexane-1,2-dicarboxylate,
di-n-hexyl 3,6-dimethylcyclohexane-1,2-dicarboxylate,
di-n-octyl 3,6-dimethylcyclohexane-1,2-dicarboxylate,
diisobutyl 3-methyl-6-ethylcyclohexane-1,2-dicarboxylate,
di-n-hexyl 3-methyl-6-ethylcyclohexane-1,2-dicarboxylate,
di-n-octyl 3-methyl-6-ethylcyclohexane-1,2-dicarboxylate,
diisobutyl 3-methyl-6-n-propylcyclohexane-1,2-dicarboxylate,
di-n-hexyl 3-methyl-6-n-propylcyclohexane-1,2-dicarboxylate,
di-n-octyl 3-methyl-6-n-propylcyclohexane-1,2-dicarboxylate,
diisobutyl 3,6-diethylcyclohexane-1,2-dicarboxylate,
di-n-hexyl 3,6-diethylcyclohexane-1,2-dicarboxylate, and
di-n-octyl 3,6-diethylcyclohexane-1,2-dicarboxylate.

The reason for this is that these compounds have high catalytic performances, and can be prepared using a Diels Alder reaction at a relatively low cost.

The compounds having the diester structure as described above may exist in the form of a cis-isomer or a trans-isomer, either of which has effects which are consistent with the purpose of the invention.

The purity of the trans-isomers (ratio of trans-isomers in the trans-isomers and cis-isomers) is often preferably more than 50%. In the case of n=6, that is, cyclohexane-1,2-dicarboxylic acid diester, and R is hydrogen in particular, the lower limit of the purity of the trans-isomers is 51%, preferably 55%, more preferably 60%, and particularly preferably 65%. The upper limit of the purity of the trans-isomers is 100%, preferably 95%, more preferably 90%, even more preferably 80%, and particularly preferably 79%.

These compounds may be used alone or in combination of two or more kinds thereof. Further, these cyclic ester compounds (a) may be used in combination with a catalyst component (b) or a catalyst component (c) as described below, as long as it does not give any adverse effect on the purpose of the invention.

Further, the cyclic ester compound (a) may be formed during the process of producing the solid titanium catalyst component (I). For example, when the solid titanium catalyst component (I) is produced, the cyclic ester compound (a) can be contained in the solid titanium catalyst component by involving a process of substantially bringing an anhydrous carboxylic acid or carboxylic acid dihalide corresponding to the cyclic ester compound (a), and a corresponding alcohol into contact with each other.

For the production of the solid titanium catalyst component (I) of the invention, a magnesium compound and a titanium compound are used, in addition to the cyclic ester compound (a).

<Magnesium Compound>

Specific examples of the magnesium compound include well-known magnesium compounds including magnesium halides such as magnesium chloride and magnesium bromide;

alkoxymagnesium halides such as methoxymagnesium chloride, ethoxymagnesium chloride and phenoxymagnesium chloride;

alkoxymagnesium such as ethoxymagnesium, isopropoxymagnesium, butoxymagnesium and 2-ethylhexoxymagnesium;

aryloxymagnesiums such as phenoxymagnesium;

magnesium carboxylates such as magnesium stearate;

and the like.

These magnesium compounds may be used alone or in combination of two or more kinds thereof. Further, these magnesium compounds may be in the form of a complex compound or a composite compound with other metals, or in the form of a mixture with other metal compounds.

Among these, halogen-containing magnesium compounds are preferred, and magnesium halide, in particular magnesium chloride is preferably used. In addition, alkoxymagnesium such as ethoxymagnesium is also preferably used. Further, the magnesium compounds may be those derived from other materials, for example, those obtained by bringing an organomagnesium compound such as a Grignard reagent, and titanium halide, silicon halide, alcohol halide, and the like into contact with each other.

<Titanium Compound>

Examples of the titanium compound include a tetravalent titanium compound represented by the following formula:

$$\text{Ti(OR)}_g X_{4-g}$$

(wherein R is a hydrocarbon group, X is a halogen atom, and g satisfies the condition $0 \leq g \leq 4$). More specifically, examples thereof include titanium tetrahalides such as $TiCl_4$ and $TiBr_4$;

alkoxytitanium trihalides such as $Ti(OCH_3)Cl_3$, $Ti(OC_2H_5)Cl_3$, $Ti(O\text{-n-}C_4H_9)Cl_3$, $Ti(OC_2H_5)Br_3$ and $Ti(O\text{-iso-}C_4H_9)Br_3$;

alkoxytitanium dihalides such as $Ti(OCH_3)_2Cl_2$ and $Ti(OC_2H_5)_2Cl_2$, alkoxytitanium monohalides such as $Ti(OCH_3)_3Cl$, $Ti(O\text{-n-}C_4H_9)_3Cl$ and $Ti(OC_2H_5)_3Br$;

tetraalkoxytitaniums such as $Ti(OCH_3)_4$, $Ti(OC_2H_5)_4$, $Ti(O\text{-n-}C_4H_9)_4$ and $Ti(O\text{-2-ethylhexyl})_4$;

and the like.

Among these, preferred are titanium tetrahalides, and particularly preferred is titanium tetrachloride. These titanium compounds can be used alone or in combination of two or more kinds thereof.

Examples of the magnesium compounds and the titanium compounds include those as described in detail in the above-described Patent Document 1, Patent Document 2, or the like.

For the production of the solid titanium catalyst component (I) used in the invention, a well-known method can be employed without limit except that the cyclic ester compound (a) is used. Specific preferable examples of the process include the following processes (P-1) to (P-4).

(P-1) Process of bringing a solid adduct comprising of a magnesium compound and a catalyst component (b), a cyclic ester compound (a) and a liquid-state titanium compound into contact with each other in a suspended state in the coexistence of an inert hydrocarbon solvent.

(P-2) Process of bringing a solid adduct comprising of a magnesium compound and a catalyst component (b), a cyclic ester compound (a) and a liquid-state titanium compound into contact with each other in plural steps.

(P-3) Process of bringing a solid adduct comprising of a magnesium compound and a catalyst component (b), a cyclic ester compound (a) and a liquid-state titanium compound into contact with each other in a suspended state in the coexistence of an inert hydrocarbon solvent, and in plural steps.

(P-4) Process of bringing a liquid-state magnesium compound comprising of a magnesium compound and a catalyst component (b), a liquid-state titanium compound and a cyclic ester compound (a) into contact with each other.

The reaction temperature is in the range of preferably −30° C. to 150° C., more preferably −25° C. to 130° C., and even more preferably −25° C. to 120° C.

Further, the production of the solid titanium catalyst component can be carried out, if necessary, in the presence of a well-known medium. Examples of the medium include the compounds of aromatic hydrocarbons such as toluene having some polarity, well-known aliphatic hydrocarbons or alicyclic hydrocarbons such as heptane, octane, decane and cyclohexane, and among these, aliphatic hydrocarbons are preferably exemplified.

When the olefin polymerization reaction is carried out within the above-described range, the effect of obtaining a polymer having a broad molecular weight distribution can be highly compatibilized with high stereoregularity of the obtained polymer and the activity.

(Catalyst Component (b))

For the catalyst component (b) used for the formation of the above-described solid adduct or liquid-state magnesium compound, preferred are well-known compounds which can solubilize the magnesium compound in the temperature range of room temperature to around 300° C., and preferred are, for example, alcohols, aldehydes, amines, carboxylic acids and a mixture thereof. Examples of these compounds include those as described in detail in the above-described Patent Document 1 or Patent Document 2.

More specific examples of alcohols having ability to solubilize the magnesium compound include aliphatic alcohols such as methanol, ethanol, propanol, butanol, isobutanol, ethylene glycol, 2-methylpentanol, 2-ethylbutanol, n-heptanol, n-octanol, 2-ethylhexanol, decanol and dodecanol;

alicyclic alcohols such as cyclohexanol and methylcyclohexanol;

aromatic alcohols such as benzyl alcohol and methylbenzyl alcohol;

aliphatic alcohols having an alkoxy group such as n-butyl cellosolve;

and the like.

Examples of the carboxylic acids include organic carboxylic acids having at least 7 carbon atoms, such as caprylic acid and 2-ethylhexanoic acid. Examples of the aldehydes include aldehydes having at least 7 carbon atoms, such as capric aldehyde and 2-ethylhexyl aldehyde.

Examples of the amines include amines having at least 6 carbon atoms, such as heptylamine, octylamine, nonylamine, laurylamine and 2-ethylhexylamine.

As the catalyst component (b), preferred are the above-described alcohols, and particularly preferred are ethanol, propanol, butanol, isobutanol, hexanol, 2-ethylhexanol, decanol and the like.

The amounts of the magnesium compound and the catalyst component (b) to be used in the production of the solid adduct or liquid-state magnesium compound vary depending on the kinds thereof, the contact conditions, or the like, but the magnesium compound is used in an amount of 0.1 to 20 mol/liter, and preferably 0.5 to 5 mol/liter per unit volume of the catalyst component (b). Further, if desired, a medium which is inert to the solid adduct can be used in combination. Preferable examples of the medium include well-known hydrocarbon compounds such as heptane, octane and decane.

The compositional ratio of magnesium of the obtained solid adduct or liquid-state magnesium compound to the catalyst component (b) varies depending on the kinds of the compound to be used, and thus it cannot be generally defined. But the amount of the catalyst component (b) is in the range of preferably 2.0 moles or more, more preferably 2.2 moles or more, even more preferably 2.3 moles or more and particularly preferably 2.4 moles or more and 5 moles or less, based on 1 mole of magnesium in the magnesium compound.

<Aromatic Carboxylic Acid Ester and/or Compound Having Two or More Ether Linkages Through a Plurality of Carbon Atoms>

The solid titanium catalyst component (I) used in the invention may further comprise an aromatic carboxylic acid ester and/or a compound having two or more ether linkages through a plurality of carbon atoms (hereinafter, also referred to as the "catalyst component (c)") as far as the purpose of the present invention is not impaired. When the solid titanium catalyst component (I) used in the invention contains the catalyst component (c), activity and stereoregularity may be increased.

As this catalyst component (c), well-known aromatic carboxylic acid esters or polyether compounds, which are preferably used for the conventionally used catalysts for olefin polymerization, for example, those as described in the above-described Patent Document 2, JP-A No. 2001-354714, or the like can be used without limit.

Specific examples of this aromatic carboxylic acid ester include aromatic polyvalent carboxylic acid esters such as phthalic acid ester, in addition to aromatic carboxylic acid monoesters such as benzoic acid ester and toluic acid ester. Among these, preferred are aromatic polyvalent carboxylic acid esters, and more preferred are phthalic acid esters. As these phthalic acid esters, preferred are phthalic acid alkyl esters such as ethyl phthalate, n-butyl phthalate, isobutyl phthalate, hexyl phthalate and heptyl phthalate, and particularly preferred is diisobutyl phthalate.

Further, more specific examples of the polyether compounds include the compounds represented by the following formula (3):

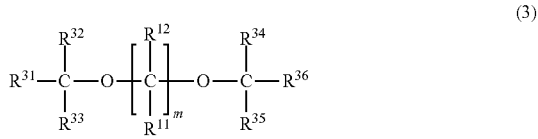

(3)

Further, in the above formula (3), m is an integer satisfying the condition $1 \leq m \leq 10$, and preferably an integer satisfying the condition $3 \leq m \leq 10$, and $R^{11}$ to $R^{36}$ are each independently a hydrogen atom or substituents having at least one kind of element selected from carbon, hydrogen, oxygen, fluorine, chlorine, bromine, iodine, nitrogen, sulfur, phosphorus, boron and silicon.

When m is 2 or more, a plurality of $R^{11}$ and $R^{12}$ may be the same or different from each other. Any of $R^{11}$ to $R^{36}$, and preferably $R^{11}$ and $R^{12}$ may be bonded to each other to form a ring other than a benzene ring.

Specific examples of some of these compounds include monosubstituted dialkoxypropanes such as
2-isopropyl-1,3-dimethoxypropane,
2-s-butyl-1,3-dimethoxypropane, and
2-cumyl-1,3-dimethoxypropane;

disubstituted dialkoxypropanes such as
2-isopropyl-2-isobutyl-1,3-dimethoxypropane,
2,2-dicyclohexyl-1,3-dimethoxypropane,
2-methyl-2-isopropyl-1,3-dimethoxypropane,
2-methyl-2-cyclohexyl-1,3-dimethoxypropane,
2-methyl-2-isobutyl-1,3-dimethoxypropane,
2,2-diisobutyl-1,3-dimethoxypropane,
2,2-bis(cyclohexylmethyl)-1,3-dimethoxypropane,
2,2-diisobutyl-1,3-diethoxypropane,
2,2-diisobutyl-1,3-dibutoxypropane,
2,2-di-s-butyl-1,3-dimethoxypropane,
2,2-dineopentyl-1,3-dimethoxypropane,
2-isopropyl-2-isopentyl-1,3-dimethoxypropane and
2-cyclohexyl-2-cyclohexylmethyl-1,3-dimethoxypropane;

dialkoxyalkanes such as 2,3-dicyclohexyl-1,4-diethoxybutane,
2,3-dicyclohexyl-1,4-diethoxybutane,
2,3-diisopropyl-1,4-diethoxybutane,
2,4-diphenyl-1,5-dimethoxypentane,
2,5-diphenyl-1,5-dimethoxyhexane,
2,4-diisopropyl-1,5-dimethoxypentane,
2,4-diisobutyl-1,5-dimethoxypentane and
2,4-diisoamyl-1,5-dimethoxypentane;

trialkoxyalkanes such as
2-methyl-2-methoxymethyl-1,3-dimethoxypropane,
2-cyclohexyl-2-ethoxymethyl-1,3-diethoxypropane and
2-cyclohexyl-2-methoxymethyl-1,3-dimethoxypropane;

dialkoxycycloalkenes such as
2,2-diisobutyl-1,3-dimethoxy-4-cyclohexene,
2-isopropyl-2-isoamyl-1,3-dimethoxy-4-cyclohexene, 2-cyclohexyl-2-methoxymethyl-1,3-dimethoxy-4-cyclohexene,
2-isopropyl-2-methoxymethyl-1,3-dimethoxy-4-cyclohexene,
2-isobutyl-2-methoxymethyl-1,3-dimethoxy-4-cyclohexene,
2-cyclohexyl-2-ethoxymethyl-1,3-dimethoxy-4-cyclohexene,
2-isopropyl-2-ethoxymethyl-1,3-dimethoxy-4-cyclohexene and
2-isobutyl-2-ethoxymethyl-1,3-dimethoxy-4-cyclohexene;
and the like.

Among these, preferred are 1,3-diethers, and particularly preferred are
2-isopropyl-2-isobutyl-1,3-dimethoxypropane,
2,2-diisobutyl-1,3-dimethoxypropane,
2-isopropyl-2-isopentyl-1,3-dimethoxypropane,
2,2-dicyclohexyl-1,3-dimethoxypropane and
2,2-bis(cyclohexylmethyl)-1,3-dimethoxypropane.

These compounds may be used alone or in combination of two or more kinds thereof.

The cyclic ester compound (a), the catalyst component (b) and the catalyst component (c) as described above may well be thought to belong to the components which are referred to as electron donors by a skilled person in the art. It is known that the electron donor components have the effect of enhancing stereoregularity of the obtained polymer, the effect of controlling the composition distribution of the obtained copolymer and the effect as an aggregator of controlling the particle shape and particle size of the catalyst particle, while maintaining high activity of the catalyst.

It is thought that the cyclic ester compound (a) of the invention also exhibits the effect of controlling the molecular weight distribution because it itself is an electron donor.

For the solid titanium catalyst (I) of the invention, the halogen/titanium (atomic ratio) (i.e., number of moles of the halogen atoms/number of moles of the titanium atoms) is preferably 2 to 100, and more preferably 4 to 90;

the cyclic ester compound (a)/titanium (molar ratio) (i.e., number of moles of the cyclic ester compound (a))/number of moles of the titanium atoms) is preferably 0.01 to 100, and more preferably 0.2 to 10; and as for the catalyst component (b) and the catalyst component (c), the catalyst component (b)/the titanium atom (molar ratio) is preferably 0 to 50, and more preferably 0 to 5, and the catalyst component (c)/the titanium atom (molar ratio) is preferably 0 to 50, and more preferably 0 to 5.

The magnesium/titanium (atomic ratio) (i.e., number of moles of the magnesium atoms/number of moles of the titanium atoms) is preferably 2 to 100, and more preferably 4 to 50.

The contents of the components which may be contained in addition to the cyclic ester compound (a), for example, the catalyst component (b) and the catalyst component (c) are 20% by weight or less, and preferably 10% by weight or less, based on 100% by weight of the cyclic ester compound (a).

As the more specific production conditions of the solid titanium catalyst component (I), the conditions as described in, for example, EP 585869 A1 (European patent application publication No. 0585869), the above-described Patent Document 2, or the like can be preferably employed, except that the cyclic ester compound (a) is used.

The catalyst for olefin polymerization according to the invention is characterized in that it comprises, at a specific ratio, the solid titanium catalyst component (I) used in the invention and an organometallic compound catalyst component (II) containing a metal element selected from Groups I, II and XIII of the periodic table.

<Organometallic Compound Catalyst Component (II)>

For the organometallic compound catalyst component (II), a compound containing a metal in Group XIII, for example, an organoaluminum compound and a complex alkylate of a metal in Group I and aluminum, an organometallic compound of a metal in Group II, or the like can be used. Among these, preferred is the organoaluminum compound.

Specific preferable examples of the organometallic compound catalyst component (II) include the organometallic compound catalyst components as described in well-known documents, for example, the above-described EP 585869 A1.

The aluminum compound [II] used in the invention may be exemplified by the organoaluminum compound represented by the following formula:

$$Ra_nAlX_{3-n}$$

wherein Ra is a hydrocarbon group having 1 to 12 carbon atom(s), X is halogen or hydrogen, and n is 1 to 3.

Ra is a hydrocarbon group having 1 to 12 carbon atom(s), for example, an alkyl group, a cycloalkyl group, or an aryl group, and specifically is a methyl group, an ethyl group, an n-propyl group, an isopropyl group, an isobutyl group, a pentyl group, a hexyl group, an octyl group, a cyclopentyl group, a cyclohexyl group, a phenyl group, a tolyl group, or the like.

Specific examples of the organoaluminum compound include trialkyl aluminum such as trimethyl aluminum, triethyl aluminum, triisopropyl aluminum, triisobutyl aluminum, trioctyl aluminum, and tri-2-ethylhexyl aluminum;

alkenyl aluminum such as isoprenyl aluminum;

dialkyl aluminum halide such as dimethyl aluminum chloride, diethyl aluminum chloride, diisopropyl aluminum chloride, diisobutyl aluminum chloride, and dimethyl aluminum bromide;

alkyl aluminum sesquihalide such as methyl aluminum sesquichloride, ethyl aluminum sesquichloride, isopropyl aluminum sesquichloride, butyl aluminum sesquichloride, and ethyl aluminum sesquibromide;

alkyl aluminum dihalide such as methyl aluminum dichloride, ethyl aluminum dichloride, isopropyl aluminum dichloride, and ethyl aluminum dibromide;

alkyl aluminum hydride such as diethyl aluminum hydride and diisobutyl aluminum hydride; and the like.

As the aluminum compound [II] used in the invention, triethyl aluminum is particularly preferable.

The metal (M-2) in the organometallic compound catalyst component (II) and the titanium (M-Ti) in the solid titanium catalyst component (I) according to the invention are contained such that the molar ratio satisfies:

$$350 \geq (M\text{-}2)/(M\text{-}Ti) \geq 10,$$

more preferably, $$300 \geq (M\text{-}2)/(M\text{-}Ti) \geq 50,$$

and even more preferably, $$300 \geq (M\text{-}2)/(M\text{-}Ti) \geq 100.$$

When the value of (M-2)/(M-Ti) becomes too large, the activity tends to decrease, and further the molecular weight distribution tends to become narrow.

On the contrary, when the value of (M-2)/(M-Ti) becomes too small, the activity significantly decreases. Particularly when the purity of olefin or the solvent to be used is low, the effect tends to be significant.

By the process for producing an olefin polymer of the invention, a polymer having a broad molecular weight distribution can be obtained. The reason for this is unclear at present, but is assumed to be as follows.

It is known that the cyclic hydrocarbon structures form a variety of steric structures such as a chair conformation and a boat conformation. In addition, when the cyclic structure includes a substituent, variation of the possible steric structure is further increased. When a $C^a$—$C^a$ bond linking a plurality of ester groups ($COOR^1$ group) is a single bond, variation of the possible steric structure is widened. These various possible steric structures lead to the formation of various active species on the solid titanium catalyst component (I). As a result, when the olefin polymerization is carried out by using the solid titanium catalyst component (I), the olefin polymers having various molecular weights can be prepared at one time, that is, the olefin polymers having broad molecular weight distributions can be prepared.

The organometallic compound catalyst component (II) is essential in the polymerization reaction. However, when the organometallic compound catalyst component (II) is used in excess with respect to the solid titanium catalyst component, the ester compound for giving various active species is reduced or abstracted from the solid titanium catalyst component which then prevents the formation of various active species, and therefore it may be thought to cause a decrease in the activity or a prevention in broadening the molecular weight distribution.

Accordingly, it is thought that controlling the molar ratio of (M-2)/(M-Ti) to be in an appropriate range as in the invention, is essential.

<Catalyst Component (III)>

The catalyst for olefin polymerization of the invention, if necessary, may comprise the above-described catalyst component (III) together with the solid titanium catalyst component (I) and the organometallic compound catalyst component (II). Preferable examples of the catalyst component (III) include organosilicon compounds. Examples of these organosilicon compounds include the compound represented by the following general formula (4):

$$R_nSi(OR')_{4-n} \quad (4)$$

wherein R and R' are hydrocarbon groups, and n is an integer satisfying the condition 0<n<4.

As the organosilicon compounds represented by the above formula (4), specifically diisopropyldimethoxysilane, t-butylmethyldimethoxysilane, t-butylmethyldiethoxysilane, t-amylmethyldiethoxysilane, dicyclohexyldimethoxysilane, cyclohexylmethyldimethoxysilane, cyclohexylmethyldiethoxysilane, vinyltrimethoxysilane, vinyltriethoxysilane, t-butyltriethoxysilane, phenyltriethoxysilane, cyclohexyltrimethoxysilane, cyclopentyltrimethoxysilane, 2-methylcyclopentyltrimethoxysilane, cyclopentyltriethoxysilane, dicyclopentyldimethoxysilane, dicyclopentyldiethoxysilane, tricyclopentylmethoxysilane, dicyclopentylmethylmethoxysilane, dicyclopentylethylmethoxysilane, cyclopentyldimethylethoxysilane, or the like is used.

Among these, vinyltriethoxysilane, diphenyldimethoxysilane, dicyclohexyldimethoxysilane, cyclohexylmethyldimethoxysilane or dicyclopentyldimethoxysilane is preferably used.

Also, preferable examples of the above-described organosilicon compounds further include the silane compounds represented by the following formula (5) as described in the pamphlet of International Publication WO 2004/016662.

$$Si(OR^a)_3(NR^bR^c) \quad (5)$$

In the formula (5), $R^a$ is a hydrocarbon group having 1 to 6 carbon atoms, and examples of $R^a$ include an unsaturated or saturated aliphatic hydrocarbon group having 1 to 6 carbon atoms, or the like, and particularly preferably a hydrocarbon group having 2 to 6 carbon atoms. Specific examples thereof include a methyl group, an ethyl group, an n-propyl group, an isopropyl group, an n-butyl group, an isobutyl group, a sec-butyl group, an n-pentyl group, an isopentyl group, a cyclopentyl group, an n-hexyl group, a cyclohexyl group, and the like, among which an ethyl group is particularly preferable.

In the formula (5), $R^b$ is a hydrocarbon group having 1 to 12 carbon atoms or a hydrogen atom, and examples of $R^b$ include an unsaturated or saturated aliphatic hydrocarbon group having 1 to 12 carbon atoms, a hydrogen atom, and the like. Specific examples thereof include a hydrogen atom, a methyl group, an ethyl group, an n-propyl group, an isopropyl group, an n-butyl group, an isobutyl group, a sec-butyl group, an n-pentyl group, an isopentyl group, a cyclopentyl group, an n-hexyl group, a cyclohexyl group, an octyl group, and the like, among which an ethyl group is particularly preferable.

In the formula (5), $R^c$ is a hydrocarbon group having 1 to 12 carbon atoms, and examples of $R^c$ include an unsaturated or saturated aliphatic hydrocarbon group having 1 to 12 carbon atoms, a hydrogen atom, and the like. Specific examples thereof include a methyl group, an ethyl group, an n-propyl group, an isopropyl group, an n-butyl group, an isobutyl group, a sec-butyl group, an n-pentyl group, an isopentyl group, a cyclopentyl group, an n-hexyl group, a cyclohexyl group, an octyl group, and the like, among which an ethyl group is particularly preferable.

Specific examples of the compound represented by the formula (5) include dimethylaminotriethoxysilane, diethylaminotriethoxysilane, diethylaminotrimethoxysilane, diethylaminotriethoxysilane, diethylaminotri-n-propoxysilane, di-n-propylaminotriethoxysilane, methyl-n-propylaminotriethoxysilane, t-butylaminotriethoxysilane, ethyl-n-propylaminotriethoxysilane, ethyl-isopropylaminotriethoxysilane and methylethylaminotriethoxysilane.

Further, other examples of the above-described organosilicon compounds include the compound represented by the following formula (6):

$$RNSi(OR^a)_3 \quad (6)$$

In the formula (6), RN is a cyclic amino group, and examples of the cyclic amino group include a perhydroquinolino group, a perhydroisoquinolino group, a 1,2,3,4-tetrahydroquinolino group, a 1,2,3,4-tetrahydroisoquinolino group, an octamethyleneimino group, and the like. Specific examples of the compound represented by the above formula (6) include (perhydroquinolino)triethoxysilane, (perhydroisoquinolino)triethoxysilane, (1,2,3,4-tetrahydroquinolino)triethoxysilane, (1,2,3,4-tetrahydroisoquinolino)triethoxysilane, octamethyleneiminotriethoxysilane, and the like.

These organosilicon compounds may be used in combination of two or more kinds thereof.

Further, other preferable examples of the compounds which are useful as the catalyst component (III) include polyether compounds which are exemplified as the aromatic carboxylic acid ester and/or the compound having two or more ether linkages through a plurality of carbon atoms (the catalyst component (c)).

Among these polyether compounds, preferred are 1,3-diethers, and particularly preferred is 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane and 2,2-bis(cyclohexylmethyl)-1,3-dimethoxypropane.

These compounds may be used alone or in combination of two or more kinds thereof.

Further, the catalyst for olefin polymerization of the invention may further comprise other components useful for olefin polymerization, if necessary, in addition to each of the above-described components. Examples of such other components include a support such as silica, an antistatic agent, a particle coagulant, a preservation stabilizing agent, and the like.

(Process for Olefin Polymerization)

The process for olefin polymerization according to the invention is characterized in that it comprises polymerizing an olefin by using the catalyst for olefin polymerization of the invention. In the invention, the term "polymerization" may encompass copolymerization such as random copolymerization and block copolymerization, as well as homopolymerization.

For the process for olefin polymerization of the invention, it is also possible that polymerization is carried out in the presence of a prepolymerization catalyst obtained by prepolymerization of an α-olefin in the presence of the catalyst for olefin polymerization of the invention. This prepolymerization is carried out by prepolymerization of an x-olefin in an amount of 0.1 to 1000 g, preferably 0.3 to 500 g, and particularly preferably 1 to 200 g, based on 1 g of the catalyst for olefin polymerization.

The concentration of the catalyst in the prepolymerization system may be higher than that in the polymerization system.

In the prepolymerization, the concentration of the solid titanium catalyst component (I) is in the range of preferably about 0.001 to 200 mmol, more preferably about 0.01 to 50 mmol, and particularly preferably 0.1 to 20 mmol, in terms of titanium atom, based on 1 liter of the liquid medium.

In the prepolymerization, the amount of the organometallic compound catalyst component (II) may be such that 0.1 to 1,000 g, and preferably 0.3 to 500 g of the polymer is produced, based on 1 g of the solid titanium catalyst component (I), and the amount is preferably about 0.1 to 300 mol, more preferably about 0.5 to 100 mol, and particularly preferably 1 to 50 mol in terms of the metal atom in the catalyst component (II), based on 1 mol of the titanium atom in the solid titanium catalyst component (I).

In the prepolymerization, the catalyst component (III) may be used, if necessary, and these components are used in an amount of 0.1 to 50 mol, preferably 0.5 to 30 mol, and particularly preferably 1 to 10 mol, based on 1 mol of the titanium atom in the solid titanium catalyst component (I).

The prepolymerization can be carried out under the mild condition by adding an olefin and the above-described catalyst components to an inert hydrocarbon medium.

In this case, specific examples of the inert hydrocarbon medium to be used include aliphatic hydrocarbons such as propane, butane, pentane, hexane, heptane, octane, decane, dodecane and kerosene;

alicyclic hydrocarbons such as cycloheptane, cycloheptane, methylcycloheptane, 4-cycloheptane, 4-cycloheptane and methyl-4-cycloheptane;

aromatic hydrocarbons such as benzene, toluene and xylene;

halogenated hydrocarbons such as ethylene chloride and chlorobenzene;

and a mixture thereof.

Among these inert hydrocarbon media, aliphatic hydrocarbons are particularly preferably used. As such, when the inert hydrocarbon medium is used, it is preferable that the prepolymerization is carried out batchwise.

On the other hand, the prepolymerization may be carried out by using olefin itself as a solvent, and substantially without a solvent. In this case, it is preferable that the prepolymerization is carried out continuously.

The olefins used in the prepolymerization may be the same or different from those used in the polymerization as described below, and specifically, it is preferably propylene.

The temperature for prepolymerization is in the range of preferably about −20 to +100° C., more preferably about −20 to +80° C., and even more preferably 0 to +40° C.

Next, the polymerization after the afore-mentioned prepolymerization or without prepolymerization will be described.

Examples of the olefins which can be used (that is, polymerized) for the polymerization include α-olefins having 3 to 20 carbon atoms, for example, linear olefins such as propylene, 1-butene, 1-pentene, 1-hexene, 1-octene, 1-decene, 1-dodecene, 1-tetradecene, 1-hexadecene, 1-octadecene and 1-eicosene; and branched olefins such as 4-methyl-1-pentene, 3-methyl-1-pentene and 3-methyl-1-butene, and preferred are propylene, 1-butene, 1-pentene and 4-methyl-1-pentene. Further, particularly preferred are propylene, 1-butene and 4-methyl-1-pentene, from the viewpoint that the polymer having a broader molecular weight distribution easily exhibits its advantages for the resin with high rigidity.

Along with these α-olefins, ethylene; aromatic vinyl compounds such as styrene and allylbenzene; or alicyclic vinyl compounds such as vinylcyclohexane and vinylcycloheptane can be used. Furthermore, the compound having a polyunsaturated bond such as, for example, conjugated dienes or nonconjugated dienes, for example, dienes such as cyclopentene, cycloheptene, norbornene, tetracyclododecene, isoprene and butadiene can be used as the polymerization materials together with ethylene and an α-olefin. These compounds may be used alone or in combination of two or more kinds thereof. (Hereinafter, ethylene or the olefins to be used together with the "α-olefin having 3 to 20 carbon atoms" may be also referred to as "other olefins").

Among such other olefins, preferred are ethylene and the aromatic vinyl compounds. Further, small amount, for example, 10% by weight or less, and preferably 5% by weight, based on 100% by weight of the total amount of olefins, of the other olefins such as ethylene may be used in combination therewith.

According to the invention, the prepolymerization and the polymerization can be carried out in any of liquid phase polymerizations such as bulk polymerization, solution polymerization and suspension polymerization, and vapor phase polymerization. Specifically, it is preferable to carry out polymerization in bulk polymerization propylene.

When slurry polymerization is employed for the polymerization, the inert hydrocarbons used in the prepolymerization as described above, or an olefin which is liquid at a reaction temperature can be used as a reaction solvent.

In the polymerization in the process for producing the polymer of the invention, the above-described solid titanium catalyst component (I) is used in an amount of usually about 0.0001 to 0.5 mmol, and preferably about 0.005 to 0.1 mmol, in terms of titanium atom, based on 1 liter of the polymerization volume. Further, the above-described organometallic compound catalyst component (II) is used in an amount of usually 10 to 350 mol, preferably 30 to 350 mol, and more preferably 50 to 350 mol in terms of the metal atom in the catalyst component (II), in terms of titanium atom in the solid titanium catalyst component and the prepolymerization catalyst component in the polymerization system. The above-described catalyst component (III), if used, is used in an amount of 0.001 to 50 mol, preferably 0.01 to 30 mol, and particularly preferably 0.05 to 20 mol in the organometallic compound catalyst component (II).

When the ratio of the organometal compound catalyst component (II) to titanium atom in the solid titanium catalyst component or the prepolymerization is out of the range, the effect of broadening the molecular weight distribution may be insufficient, and polymerization activity may be decrease.

If the polymerization is carried out in the presence of hydrogen, the molecular weight of the obtained polymer can be controlled to obtain a polymer with a high melt flow rate.

In the polymerization according to the invention, the polymerization temperature of olefins is in the range of usually about 20 to 200° C., preferably about 30 to 100° C., and more preferably about 50 to 90° C. The pressure is set to be in the range of usually ambient pressure to 100 kgf/cm$^2$ (9.8 MPa), and preferably about 2 to 50 kgf/cm$^2$ (0.20 to 4.9 MPa). In the process for polymerization of the invention, the polymerization can be carried out by any of batchwise, semi-continuous and continuous processes. Further, the polymerization can be carried out in two or more stages under different reaction conditions. When the multi-stage polymerization is carried out, it is possible to further broaden the molecular weight distribution of the olefin polymer.

Thus obtained olefin polymer may be any one of a homopolymer, a random copolymer, a block copolymer, and the like.

If the polymerization of an olefin, in particular the polymerization of propylene is carried out by using the catalyst for olefin polymerization, a propylene polymer with high stereo-regularity which has a content of the decane-insoluble components of 70% or more, preferably 85% or more, and particularly preferably 90% or more is obtained.

Further, according to the process for olefin polymerization of the invention, even when the polymerization is carried out in a small number of stages, for example, one stage, rather than in multi-stages, a polyolefin, in particular polypropylene, having a broad molecular weight distribution can be obtained. The process for olefin polymerization of the invention is characterized in that an olefin polymer may be often obtained, which has a higher ratio of the high molecular weight components and a lower ratio of the low molecular weight components (particularly referred to as "Beta" components (sticky components)), as compared with the conventional olefin polymers having the same melt flow rate (MFR) as the present olefin polymer. These characteristics can be confirmed by gel permeation chromatography (GPC) measurement described below, and a polymer having both of a high Mw/Mn value and a high Mz/Mw value can be obtained.

The conventional polypropylene obtained by using a solid titanium catalyst component comprising magnesium, titanium, halogen and an electron donor generally has an Mw/Mn value of 6 or less and an Mz/Mw value of less than 4, which are indicators of the molecular weight distribution as determined by GPC measurement, for example, in the region with an MFR of 1 to 10 g/10 min. However, according to the process for olefin polymerization of the invention, an olefin polymer having an Mw/Mn value of 7 to 30, and preferably 7 to 20 can be obtained under the same polymerization conditions as described above. Further, an olefin polymer having an Mz/Mw value of preferably 4 to 15, and more preferably 4.5 to 10 can be obtained. Particularly, according to the process for olefin polymerization of the invention, a polymer having a high Mz/Mw value can be often obtained.

It is commonly known to a skilled person in the art that polypropylene having a high Mw/Mn value is excellent in moldability and rigidity. On the other hand, a high Mz/Mw value indicates a high content of high molecular weight components, and thus it is expected that the obtained propylene has high melt tension and excellent moldability.

Accordingly, it is expected that the olefin polymer obtained by the polymerization process for olefin according to the invention provides an injection molded product having high rigidity and an injection molded product having high strength in the weld part. It is also expected that the stability of bubbles is high in the inflation molding, thereby attaining a film having wide width. It is also expected that a film having wide width can be obtained even with molding films or separators by the use of T-Die. It is further expected that a large molded product is easily obtained in blow molding, vacuum molding, contour extraction molding, and stamping molding.

When the process for olefin polymerization of the invention is used, a polymer having a broad molecular weight distribution can be obtained even without the use of multi-stage polymerization, and thus it is possible to make the apparatus for producing a polymer simpler. Further, when the conventional multi-stage polymerization is applied, it is expected that a polymer with more excellent melt tension and moldability can be obtained.

As other methods for obtaining a polymer having a broad molecular weight distribution, the methods of dissolving and mixing, or dissolving and kneading the polymers having different molecular weights can be employed, but the polymers obtained by these methods may have insufficient in improvement on melt tension or moldability, while involving relatively complicated operations. The reason for this is presumed that the polymers having different molecular weights are basically difficult to be mixed with each other. On the other hand, since the polymers obtained by means of the process for olefin polymerization of the invention are mixture of the polymers having extremely broad, different molecular weights in a catalytic level, that is, a nano-level, it is expected that they have high melt tension and excellent moldability.

Hereinbelow, the present invention will be described with reference to Examples, but it should be not construed that the invention is limited to these Examples.

In the following Examples, the bulk specific gravity, the melt flow rate, the content of the decane-soluble (insoluble) components, and the molecular weight distribution of the propylene polymer were measured by the methods described below.

(1) Bulk Specific Gravity:

The bulk specific gravity was measured in accordance with JIS K-6721.

(2) Melt Flow Rate (MFR):

The melt flow rate (MFR) was measured in accordance with ASTM D 1238E at a measurement temperature of 230° C. in the case of a propylene polymer, and 260° C. in the case of a 4-methyl-1-pentene polymer.

(3) Content of Decane-Soluble (Insoluble) Components:

Into the glass container for measurement were introduced about 3 g (measurement was made in the order of 10$^{-4}$ g, and the weight was represented by b (g) in the following equation) of a propylene polymer, 500 ml of decane, and a small amount of a heat-resistant stabilizer soluble in decane, and the mixture was stirred with a stirrer while elevating the temperature to 150° C. over 2 hours under a nitrogen atmosphere to dissolve the propylene polymer, maintained at 150° C. for 2 hours, and then slowly cooled to 23° C. over 8 hours. The solution containing the obtained precipitates of the propylene polymer was filtered under reduced pressure with a glass filter of a 25G-4 specification manufactured by Iwata glass Co., Ltd. 100 ml of the filtrate was taken and dried under reduced pressure to obtain a portion of the decane-soluble components, the weight of which was measured in the order of $10^{-4}$ g (this weight was represented by a (g) in the following equation). After this operation, the amount of the decane-soluble components was determined by the following equation:

Content of decane-soluble components=100×(500×a)/(100×b)

Content of decane-insoluble components=100−100×(500×a)/(100×b)

(4) Molecular Weight Distribution:

The Mw/Mn value and the Mz/Mw value were calculated by analyzing, using a well-known method, the chromatogram obtained by the measurement under the following conditions. The measurement time per one sample was 60 minutes.

Liquid chromatograph: ALC/GPC 150-C plus type manufactured by Waters Co., Ltd. (Integrated type differential refractometer-detector)

Column: GMH6-HT×2 and GMH6-HTL×2 manufactured by Tosoh Corporation connected in series Mobile phase medium: o-dichlorobenzene Flow rate: 1.0 ml/min Measurement temperature: 140° C.

Process for producing calibration curve: Using standard polystyrene sample

Concentration of sample: 0.10% (w/w)

Amount of sample solution: 500 μl (5) Purity of Trans-Isomers:

The purity of the trans-isomers was determined by the measurement using a conventional method of Nuclear Magnetic Resonance Spectrum (NMR). Specific conditions for measurement condition are as follows.

In the case of the compound having the purity of less than 95%, the purity of the isomers was controlled by mixing each of the predetermined ratios of the trans-isomeric compounds and the cis-isomeric compounds.

The purity of the trans-isomers were calculated by conducting $^1$H-NMR measurement under the following conditions, and using the area ($A^t$) of the trans-isomers of methine hydrogen which bonds to the $C^\alpha$ to which $COOR^1$ is bonded, and the area ($A^s$) of the signals of the cis-isomers, by means of the following equation:

Apparatus: JEOL GSX-400 type

Solvent: Heavy chloroform

Standard material: Tetramethylsilane

Temperature: 25° C.

Accumulation times: 40

Repetition time: 6 seconds

Ratio of trans-isomers: $100 \times A^t/(A^t+A^s)$

The signals of the cis-isomers are detected in the lower field than that of the signals of the trans-isomers. The difference varies depending on the structure thereof, but is approximately 0.2 to 0.4 ppm. The specific position varies depending on the structure thereof, but the cis-isomers are detected in the position of 2.7 to 3.2 ppm, and the trans-isomers are detected in the position of 2.5 to 3.0 ppm.

(6) Melting Point, Crystallization Temperature:

The melting point and the crystallization temperature were measured by a conventional method using a DSC device. Specifically, the measurement is as follows.

The polymer was melted at 200° C. for 5 minutes and pressed at a pressure of 3 to 5 MPa to obtain a press sheet. About 5 mg of this press sheet was subjected to DSC measurement under the following conditions.

DSC device: Perkin Elmer DSC-7 type device

Conditions for elevating or lowering temperature:

First step—Elevating the temperature from room temperature to 200° C. at a temperature elevating rate of 320° C./min, and maintaining at 200° C. for 10 minutes;

Second step—Lowering the temperature from 200° C. to 30° C. at a temperature lowering rate of 10° C./min, and maintaining at 30° C. for 5 minutes; and Third step—Elevating the temperature from 30° C. to 200° C. at a temperature elevating rate of 10° C./min (The crystallization temperature is observed at a time of lowering the temperature in the second step, and the melting point is observed at a time of elevating the temperature in the third step.)

In addition, as the compound corresponding to the above-described cyclic ester compound (a) of the invention, a product synthesized by AZUMA-Japan, Inc. was used unless specifically mentioned otherwise. The purities of the trans-isomer or the cis-isomer are both 95% or more unless specifically mentioned otherwise.

Example 1

Production of Solid Titanium Catalyst Component (α1)

A high speed stirring device having an internal volume of 2 liters (manufactured by Tokushu Kika Kogyo Co., Ltd.) was sufficiently purged with nitrogen, and 700 ml of purified decane, 10 g of commercial available magnesium chloride, 24.2 g of ethanol and 3 g of Leodol (trade name) SP-S20 (sorbitan distearate, manufactured by Kao Corporation) were charged thereinto. While stirring this suspension, the temperature of the system was elevated and the suspension was stirred at 120° C. and 800 rpm for 30 minutes. Then, this suspension was transferred to a 2-liter glass flask (equipped with a stirrer) which was previously charged with 1 liter of purified decane cooled to −10° C. by using a Teflon (registered trade mark) tube having an inner diameter of 5 mm under high speed stirring so as not to generate the precipitates. The solid obtained from liquid transferring was filtered and sufficiently washed with purified n-hexane to obtain a solid adduct in which 2.8 mol of ethanol is coordinated to 1 mol of magnesium chloride.

46.2 mmol of the solid adduct, in terms of magnesium atom, which was suspended in 30 ml of decane, was wholly introduced into 200 ml of titanium tetrachloride which was maintained at −20° C., under stirring. The temperature of the mixture was elevated to 80° C. over 5 hours. When the temperature reached 80° C., diisobutyl 4-methylcylcohexane-1,2-dicarboxylate (a mixture of a cis-isomer and a trans-isomer) was added thereto in a proportion of 0.15 mol, based on 1 mol of a magnesium atom in the solid adduct, and then the temperature thereof was elevated to 120° C. over 40 minutes. The temperature was maintained at 120° C. under stirring for 90 minutes to effect the reaction.

After the completion of the reaction for 90 minutes, a solid portion was recovered by hot filtration. This solid portion was resuspended in 200 ml of titanium tetrachloride, and the temperature thereof was elevated to 130° C., and then maintained at that temperature under stirring for 45 minutes to effect reaction. After the completion of the reaction for 45 minutes, a solid portion was recovered again by hot filtration.

The recovered solid portion was sufficiently washed with decane and heptane at 100° C. until a free titanium compound was no longer detected in the washing solution.

Thus, the solid titanium catalyst component (α1) which was prepared in the above procedure was stored as a decane slurry. An aliquot portion of the slurry was picked and dried to examine the catalyst composition.

(Polymerization)

To a polymerization vessel with an internal volume of 2 liters, 500 g of propylene and 1 NL of hydrogen were added at room temperature, and then 0.5 mmol of triethylaluminum, 0.1 mmol of cyclohexylmethyldimethoxysilane and 0.004 mmol, in terms of titanium atom, of the solid titanium catalyst component (α1), and the internal temperature of the polymerization vessel was rapidly elevated to 70° C. After polymerization at 70° C. for 1 hour, a small amount of methanol was added thereto to stop the reaction, and propylene was purged. The obtained polymer particles were dried under reduced pressure overnight at 80° C.

The activity of the catalyst, and the MFR, the content of the decane-insoluble components, the bulk specific gravity, and the molecular weight distribution (Mw/Mn, Mz/Mw) of the obtained polymer were shown in Table 1.

Example 2

Production of Solid Titanium Catalyst Component (α2)

In the same manner as in Example 1 except that diethyl 4-methylcyclohexane-1,2-dicarboxylate (a mixture of a cis-isomer and a trans-isomer) was used instead of diisobutyl 4-methylcyclohexane-1,2-dicarboxylate (a mixture of a cis-isomer and a trans-isomer), a solid titanium catalyst component (α2) was obtained.

(Polymerization)

In the same manner as in Example 1 except that the solid titanium catalyst component (α1) was used instead of the solid titanium catalyst component (α2), the propylene polymerization was carried out. The results were shown in Table 1.

Example 3

Production of Solid Titanium Catalyst Component (α3)

In the same manner as in Example 1 except that a cis-isomer of diethyl 4-methyl-4-cyclohexene-1,2-dicarboxylate was used instead of diisobutyl 4-methylcyclohexane-1,2-dicarboxylate (a mixture of a cis-isomer and a trans-isomer), a solid titanium catalyst component (α3) was obtained.

(Polymerization)

In the same manner as in Example 1 except that the solid titanium catalyst component (α3) was used, the propylene polymerization was carried out. The results were shown in Table 1.

Example 4

Production of Solid Titanium Catalyst Component (α4)

In the same manner as in Example 1 except that di-n-octyl 3-methyl-4-cyclohexene-1,2-dicarboxylate (a mixture of a trans-isomer and a cis-isomer) was used instead of diisobutyl 4-methylcyclohexane-1,2-dicarboxylate (a mixture of a cis-isomer and a trans-isomer), a solid titanium catalyst component (α4) was obtained.

(Polymerization)

In the same manner as in Example 1 except that the solid titanium catalyst component (α4) was used, the propylene polymerization was carried out. The results were shown in Table 1.

Example 5

Production of Solid Titanium Catalyst Component (α5)

In the same manner as in Example 1 except that a mixture of diisobutyl 3-methyl-4-cyclohexene-1,2-dicarboxylate and diisobutyl 4-methyl-4-cyclohexene-1,2-dicarboxylate was used instead of diisobutyl 4-methylcyclohexane-1,2-dicarboxylate (a mixture of a cis-isomer and a trans-isomer), a solid titanium catalyst component (α5) was obtained.

(Polymerization)

In the same manner as in Example 1 except that the solid titanium catalyst component (α5) was used, the propylene polymerization was carried out. The results were shown in Table 1.

Example 6

Production of Solid Titanium Catalyst Component (α6)

In the same manner as in Example 1 except that di-n-octyl 3-methyl-4-cyclohexene-1,2-dicarboxylate and di-n-octyl 4-methyl-4-cyclohexene-1,2-dicarboxylate were used instead of diisobutyl 4-methylcyclohexane-1,2-dicarboxylate (a mixture of a cis-isomer and a trans-isomer), solid titanium catalyst component (α6) was obtained.

(Polymerization)

In the same manner as in Example 1 except that the solid titanium catalyst component (α6) was used, the propylene polymerization was carried out. The results were shown in Table 1.

Example 7

Production of Solid Titanium Catalyst Component (α7)

In the same manner as in Example 1 except that diisobutyl norbornane-2,3-dicarboxylate was used instead of diisobutyl 4-methylcyclohexane-1,2-dicarboxylate (a mixture of a cis-isomer and a trans-isomer), a solid titanium catalyst component (α7) was obtained.

(Polymerization)

In the same manner as in Example 1 except that the solid titanium catalyst component (α7) was used, the propylene polymerization was carried out. The results were shown in Table 1.

Example 8

Production of Solid Titanium Catalyst Component (α8)

In the same manner as in Example 1 except that diisobutyl 3,6-diphenylcyclohexane-1,2-dicarboxylate was used instead of diisobutyl 4-methylcyclohexane-1,2-dicarboxylate (a mixture of a cis-isomer and a trans-isomer), a solid titanium catalyst component (α8) was obtained.
(Polymerization)

In the same manner as in Example 1 except that the solid titanium catalyst component (α8) was used, the propylene polymerization was carried out. The results were shown in Table 1.

Example 9

Production of Solid Titanium Catalyst Component (α9)

In the same manner as in Example 1 except that diisobutyl 3-methylcyclohexane-1,2-dicarboxylate (a cis-isomer) was used instead of diisobutyl 4-methylcyclohexane-1,2-dicarboxylate (a mixture of a cis-isomer and a trans-isomer), a solid titanium catalyst component (α9) was obtained.
(Polymerization)

In the same manner as in Example 1 except that the solid titanium catalyst component (α9) was used, the propylene polymerization was carried out. The results were shown in Table 1.

Example 10

Production of Solid Titanium Catalyst Component (α10)

In the same manner as in Example 1 except that di-n-octyl 3-methylcyclohexane-1,2-dicarboxylate (a cis-isomer) was used instead of diisobutyl 4-methylcyclohexane-1,2-dicarboxylate (a mixture of a cis-isomer and a trans-isomer), a solid titanium catalyst component (α10) was obtained.
(Polymerization)

In the same manner as in Example 1 except that the solid titanium catalyst component (α10) was used, the propylene polymerization was carried out. The results were shown in Table 1.

Example 11

Production of Solid Titanium Catalyst Component (α11)

In the same manner as in Example 1 except that diisobutyl 3,6-dimethylcyclohexane-1,2-dicarboxylate (content of a trans-isomer: 74%) was used instead of diisobutyl 4-methylcyclohexane-1,2-dicarboxylate (a mixture of a cis-isomer and a trans-isomer), a solid titanium catalyst component (α11) was obtained.
(Polymerization)

In the same manner as in Example 1 except that the solid titanium catalyst component (α11) was used, the propylene polymerization was carried out. The results were shown in Table 1.

Example 12

Production of Solid Titanium Catalyst Component (α12)

In the same manner as in Example 1 except that di-n-octyl 3,6-dimethylcyclohexane-1,2-dicarboxylate (a cis-isomer) was used instead of diisobutyl 4-methylcyclohexane-1,2-dicarboxylate (a mixture of a cis-isomer and a trans-isomer), a solid titanium catalyst component (α12) was obtained.
(Polymerization)

In the same manner as in Example 1 except that the solid titanium catalyst component (α12) was used, the propylene polymerization was carried out. The results were shown in Table 1.

Example 13

Production of Solid Titanium Catalyst Component (α13)

In the same manner as in Example 1 except that diisobutyl 3-methyl-6-n-propylcyclohexane-1,2-dicarboxylate was used instead of diisobutyl 4-methylcyclohexane-1,2-dicarboxylate (a mixture of a cis-isomer and a trans-isomer), a solid titanium catalyst component (α13) was obtained.
(Polymerization)

In the same manner as in Example 1 except that the solid titanium catalyst component (α13) was used, the propylene polymerization was carried out. The results were shown in Table 1.

TABLE 1

| | | Activity kg-PP/g-Cat | MFR g/10 min | Content of Decane-insoluble components wt % | Bulk specific Gravity g/ml | Mw/Mn | Mz/Mw | Al/Ti m.r. |
|---|---|---|---|---|---|---|---|---|
| Ex. 1 | Diisobutyl 4-methylcyclohexane-1,2-dicarboxylate (mixture of cis-isomer and trans-isomer) | 17.7 | 11.2 | 92.8 | 0.42 | 11.5 | 4.8 | 125 |
| Ex. 2 | Diethyl 4-methylcyclohexane-1,2-dicarboxylate (mixture of cis-isomer and trans-isomer) | 18.5 | 10.1 | 93.3 | 0.44 | 9.6 | 4.3 | 125 |
| Ex. 3 | Diethyl 4-methyl-4-cyclohexene-1,2-dicarboxylate (cis-isomer) | 12.1 | 14.0 | 92.4 | 0.42 | 6.0 | 5.1 | 125 |
| Ex. 4 | Di-n-octyl 3-methyl-4-cyclohexene-1,2-dicarboxylate (mixture of cis-isomer and trans-isomer) | 20.2 | 7.6 | 93.9 | 0.41 | 9.2 | 6.9 | 125 |
| Ex. 5 | Diisobutyl 3-methyl-4-cyclohexene-1,2-dicarboxylate, | 7.5 | 12.0 | 92.2 | 0.42 | 7.4 | 7.5 | 125 |

TABLE 1-continued

|  |  | Activity kg-PP/ g-Cat | MFR g/10 min | Content of Decane-insoluble components wt % | Bulk specific Gravity g/ml | Mw/Mn | Mz/Mw | Al/Ti m.r. |
|---|---|---|---|---|---|---|---|---|
|  | and diisobutyl 4-methyl-4-cyclohexene-1,2-dicarboxylate |  |  |  |  |  |  |  |
| Ex. 6 | Di-n-octyl 3-methyl-4-cyclohexene-1,2-dicarboxylate, and di-n-octyl 4-methyl-4-cyclohexene-1,2-dicarboxylate | 16.4 | 12.5 | 91.0 | 0.41 | 9.4 | 4.9 | 125 |
| Ex. 7 | Diisobutyl norbornane-2,3-dicarboxylate | 15.0 | 16.0 | 93.5 | 0.50 | 7.8 | 4.7 | 125 |
| Ex. 8 | Diisobutyl 3,6-diphenylcyclohexane-1,2-dicarboxylate | 19.9 | 13.5 | 91.9 | 0.49 | 7.8 | 4.1 | 125 |
| Ex. 9 | Diisobutyl 3-methylcyclohexane-1,2-dicarboxylate (cis-isomer) | 16.7 | 6.6 | 93.5 | 0.43 | 19.5 | 7.9 | 125 |
| Ex. 10 | Di-n-octyl 3-methylcyclohexane-1,2-dicarboxylate (cis-isomer) | 19.2 | 4.9 | 94.2 | 0.43 | 19.6 | 7.1 | 125 |
| Ex. 11 | Diisobutyl 3,6-dimethylcyclohexane-1,2-dicarboxylate (content of trans-isomer: 74%) | 25.8 | 2.9 | 97.6 | 0.48 | 18.2 | 6.9 | 125 |
| Ex. 12 | Di-n-octyl 3,6-dimethylcyclohexane-1,2-dicarboxylate (cis-isomer) | 20.7 | 11.5 | 92.9 | 0.42 | 13.1 | 8.3 | 125 |
| Ex. 13 | Diisobutyl 3-methyl-6-n-propylcyclohexane-1,2-dicarboxylate | 28.9 | 2.6 | 97.7 | 0.42 | 15.7 | 13.6 | 125 |

Example 14

Production of Solid Titanium Catalyst Component (α14)

In the same manner as in Example 1, 2.8 mol of ethanol was coordinated to 1 mol of magnesium chloride to obtain a solid adduct.

46.2 mmol of the solid adduct, in terms of magnesium atom, which was suspended in 30 ml of decane, was wholly introduced into 200 ml of titanium tetrachloride which was maintained at −20° C., under stirring. The temperature of the mixed solution was elevated to 80° C. over 5 hours. When the temperature reached 80° C., diethyl cyclohexane-1,2-dicarboxylate (trans-isomer: 33%) was added thereto in a proportion of 0.15 mol, based on 1 mol of magnesium atom in the solid adduct, and then the temperature thereof was elevated to 120° C. over 40 minutes. The temperature was maintained at 120° C. under stirring for 90 minutes to effect the reaction.

After the completion of the reaction for 90 minutes, a solid portion was recovered by hot filtration. This solid portion was resuspended in 200 ml of titanium tetrachloride, and the temperature thereof was elevated to 130° C., and then maintained at that temperature under stirring for 45 minutes to effect reaction. After the completion of the reaction for 45 minutes, a solid portion was recovered again by hot filtration. The recovered solid portion was sufficiently washed with decane and heptane at 100° C. until a free titanium compound was no longer detected in the washing solution.

Thus, the solid titanium catalyst component (α14) which was prepared in the above procedure was stored as a decane slurry. An aliquot portion of the slurry was picked and dried to examine the catalyst composition.

The composition of thus obtained solid titanium catalyst component (α14) was such that titanium was 2.4 mass %, magnesium was 20 mass %, chlorine was 65 mass %, and an ethanol residue was 0.3 mass %.

(Polymerization)

To a polymerization vessel with an internal volume of 2 liters, 500 g of propylene and 1 NL of hydrogen were added at room temperature, and then 0.5 mmol of triethylaluminum, 0.1 mmol of cyclohexylmethyldimethoxysilane and 0.004 mmol, in terms of titanium atom, of the solid titanium catalyst component prepared in the above (α14) were added thereto, and the internal temperature of the polymerization vessel was rapidly elevated to 70° C. At this time, the internal pressure of the polymerization vessel was 3.1 MPa (gauge pressure) (absolute pressure: 3.2 MPa). After polymerization at 70° C. for 1 hour, a small amount of methanol was added thereto to stop the reaction, and propylene was purged. The obtained polymer particles were dried under reduced pressure overnight at 80° C.

The activity of the catalyst, and the MFR, the content of the decane-insoluble components, the bulk specific gravity, and the molecular weight distribution (Mw/Mn, Mz/Mw) of the obtained polymer were shown in Table 2.

Further, the saturation vapor pressure of propylene at 70° C. is 3.0 MPa.

Example 15

Production of Solid Titanium Catalyst Component (α15)

In the same manner as in Example 14 except that a trans-isomer of diethyl cyclohexane-1,2-dicarboxylate was used instead of diethyl cyclohexane-1,2-dicarboxylate (trans-isomer: 33%), a solid titanium catalyst component (α15) was obtained.

(Polymerization)

In the same manner as in Example 14 except that the solid titanium catalyst component (α15) was used instead of solid titanium catalyst component (α14), the propylene polymerization was carried out. The results were shown in Table 2.

Example 16

Production of Solid Titanium Catalyst Component (α16)

In the same manner as in Example 14 except that di-n-octyl cyclohexane-1,2-dicarboxylate (trans-isomer: 29%) was used instead of diethyl cyclohexane-1,2-dicarboxylate (trans-isomer: 33%), a solid titanium catalyst component (α16) was obtained.

(Polymerization)

In the same manner as in Example 14 except that the solid titanium catalyst component (α16) was used, the propylene polymerization was carried out. The results were shown in Table 2.

Example 17

Production of Solid Titanium Catalyst Component (α7)

In the same manner as in Example 14 except that a trans-isomer of diisobutyl cyclohexane-1,2-dicarboxylate was used instead of diethyl cyclohexane-1,2-dicarboxylate (trans-isomer: 33%), a solid titanium catalyst component (α17) was obtained.

(Polymerization)

In the same manner as in Example 14 except that the solid titanium catalyst component (α17) was used, the propylene polymerization was carried out. The results were shown in Table 2.

Example 18

Production of Solid Titanium Catalyst Component (α18)

In the same manner as in Example 14 except that diethyl 4-cyclohexene-1,2-dicarboxylate (trans-isomer: 50%) was used instead of diethyl cyclohexane-1,2-dicarboxylate (trans-isomer: 33%), a solid titanium catalyst component (α18) was obtained.

(Polymerization)

In the same manner as in Example 14 except that the solid titanium catalyst component (α18) was used, the propylene polymerization was carried out. The results were shown in Table 2.

Example 19

Production of Solid Titanium Catalyst Component (α19)

In the same manner as in Example 14 except that a trans-isomer of diethyl 4-cyclohexene-1,2-dicarboxylate was used instead of diethyl cyclohexane-1,2-dicarboxylate (trans-isomer: 33%), a solid titanium catalyst component (α19) was obtained.

(Polymerization)

In the same manner as in Example 14 except that the solid titanium catalyst component (α19) was used, the propylene polymerization was carried out. The results were shown in Table 2.

Example 20

Production of Solid Titanium Catalyst Component (α20)

In the same manner as in Example 14 except that a trans-isomer of diethyl 4-cyclohexene-1,2-dicarboxylate was used in a proportion of 0.125 mol relative to 1 mol of magnesium, instead of diethyl cyclohexane-1,2-dicarboxylate (trans-isomer: 33%) (0.15 mol relative to 1 mol of magnesium), a solid titanium catalyst component (α20) was obtained.

(Polymerization)

In the same manner as in Example 14 except that the solid titanium catalyst component (α20) was used, the propylene polymerization was carried out. The results were shown in Table 2.

Example 21

Production of Solid Titanium Catalyst Component (α21)

In the same manner as in Example 14 except that a trans-isomer of diisobutyl 4-cyclohexene-1,2-dicarboxylate was used instead of diethyl cyclohexane-1,2-dicarboxylate (trans-isomer: 33%), a solid titanium catalyst component (α21) was obtained.

(Polymerization)

In the same manner as in Example 14 except that the solid titanium catalyst component (α21) was used, the propylene polymerization was carried out. The results were shown in Table 2.

Example 22

Production of Solid Titanium Catalyst Component (α22)

In the same manner as in Example 14 except that a cis-isomer of di-n-octyl 4-cyclohexene-1,2-dicarboxylate was used instead of diethyl cyclohexane-1,2-dicarboxylate (trans-isomer: 33%), a solid titanium catalyst component (α22) was obtained.

(Polymerization)

In the same manner as in Example 14 except that the solid titanium catalyst component (α22) was used, the propylene polymerization was carried out. The results were shown in Table 2.

Example 23

Production of Solid Titanium Catalyst Component (α23)

In the same manner as in Example 14 except that di-n-octyl 4-cyclohexene-1,2-dicarboxylate (trans-isomer: 50%) was used instead of diethyl cyclohexane-1,2-dicarboxylate (trans-isomer: 33%), a solid titanium catalyst component (α23) was obtained.

(Polymerization)

In the same manner as in Example 14 except that the solid titanium catalyst component (α23) was used, the propylene polymerization was carried out. The results were shown in Table 2.

Example 24

Production of Solid Titanium Catalyst Component (α24)

In the same manner as in Example 14 except that diisobutyl cyclopentane-1,2-dicarboxylate (trans-isomer) was used instead of diethyl cyclohexane-1,2-dicarboxylate (trans-isomer: 33%), a solid titanium catalyst component (α24) was obtained.

(Polymerization)

In the same manner as in Example 14 except that the solid titanium catalyst component (α24) was used, the propylene polymerization was carried out. The results were shown in Table 2.

Example 25

Production of Solid Titanium Catalyst Component (α25)

In the same manner as in Example 14 except that diisobutyl cycloheptane-1,2-dicarboxylate (trans-isomer) was used instead of diethyl cyclohexane-1,2-dicarboxylate (trans-isomer: 33%), a solid titanium catalyst component (α25) was obtained.

(Polymerization)

In the same manner as in Example 14 except that the solid titanium catalyst component (α25) was used, the propylene polymerization was carried out. The results were shown in Table 2.

Example 26

Production of Solid Titanium Catalyst Component (α26)

First, in the same manner as in Example 14, 2.8 mol of ethanol was coordinated to 1 mol of magnesium chloride to obtain a solid adduct.

46.2 mmol of the solid adduct, in terms of magnesium atom, which was suspended in 30 ml of decane, was wholly introduced to 200 ml of titanium tetrachloride which was maintained at −20° C., under stirring. The temperature of the mixed solution was elevated to 80° C. over 5 hours. When the temperature reached 80° C., 2-isobutyl-2-isopropyl-1,3-dimethoxypropane was added thereto in a proportion of 0.15 mol, based on 1 mol of magnesium atom in the solid adduct, and then the temperature thereof was elevated to 120° C. over 40 minutes. When the temperature reached 120° C., diethyl 4-cyclohexene-1,2-dicarboxylate (trans-isomer) was added thereto in a proportion of 0.15 mol, based on 1 mol of magnesium atom in the solid adduct, and then the temperature thereof was maintained at 120° C. over 90 minutes under stirring.

After the completion of the reaction for 90 minutes, a solid portion was recovered by hot filtration. This solid portion was resuspended in 200 ml of titanium tetrachloride, and the temperature thereof was elevated to 130° C., and then maintained at that temperature under stirring for 45 minutes to effect reaction. After the completion of the reaction for 45 minutes, a solid portion was recovered again by hot filtration. The recovered solid portion was sufficiently washed with decane and heptane at 100° C. until a free titanium compound was no longer detected in the washing solution.

Thus, the solid titanium catalyst component (α26) which was prepared in the above procedure was stored as a decane slurry. An aliquot portion of the slurry was picked and dried to examine the catalyst composition.

The composition of the thus obtained solid titanium catalyst component (α26) was such that titanium was 2.0 mass %, magnesium was 19 mass %, chlorine was 60 mass %, and an ethanol residue was 0.2 mass %.

(Polymerization)

To a polymerization vessel with an internal volume of 2 liters, 500 g of propylene, and 1 NL of hydrogen were added at room temperature, and then 0.5 mmol of triethylaluminum, 0.1 mmol of cyclohexylmethyldimethoxysilane and 0.004 mmol, in terms of titanium atom, of the solid titanium catalyst component (α26) were added thereto, and the internal temperature of the polymerization vessel was rapidly elevated to 70° C. After polymerization at 70° C. for 1 hour, a small amount of methanol was added thereto to stop the reaction, and propylene was purged. The obtained polymer particles were dried under reduced pressure overnight at 80° C.

The activity of the catalyst, and the MFR, the content of the decane-insoluble components, the bulk specific gravity, and the molecular weight distribution (Mw/Mn, Mz/Mw) of the obtained polymer were shown in Table 2.

Example 27

Production of Solid Titanium Catalyst Component (α27)

In the same manner as in Example 26 except that diisobutyl phthalate (reagent of special grade, manufactured by Wako Pure Chemicals, Co., Ltd.) was used in a proportion of 0.10 mol, based on 1 mol of magnesium atom in the solid adduct, instead of 2-isobutyl-2-isopropyl-1,3-dimethoxypropane, and diisobutyl cyclohexane-1,2-dicarboxylate (trans-isomer) was used in a proportion of 0.05 mol, based on 1 mol of magnesium atom in the solid adduct, instead of diethyl 4-cyclohexene-1,2-dicarboxylate (trans-isomer), a solid titanium catalyst component (α27) was obtained.

(Polymerization)

In the same manner as in Example 26 except that the solid titanium catalyst component (α27) was used, the propylene polymerization was carried out. The results were shown in Table 2.

Example 28

Production of Solid Titanium Catalyst Component (α28)

First, in the same manner as in Example 1, 2.8 mol of ethanol was coordinated to 1 mol of magnesium chloride to obtain a solid adduct.

46.2 mmol of the solid adduct, in terms of magnesium atom, which was suspended in 30 ml of decane, was wholly introduced to 200 ml of titanium tetrachloride which was maintained at −20° C., under stirring. The temperature of the mixed solution was elevated to 80° C. over 5 hours. When the temperature reached 80° C., diisobutyl cyclohexane-1,2-dicarboxylate (ratio of trans-isomer: 78%) was added thereto in a proportion of 0.15 mol, based on 1 mol of magnesium atom in the solid adduct, and then the temperature thereof was elevated to 90° C. over 10 minutes. When the temperature reached 90° C., 2-isobutyl-2-isopropyl-1,3-dimethoxypropane was added thereto in a proportion of 0.05 mol, based on 1 mol of magnesium atom in the solid adduct, and then the temperature thereof was maintained at 90° C. over 90 minutes under stirring to effect the reaction.

After the completion of the reaction for 90 minutes, a solid portion was recovered by hot filtration. This solid portion was resuspended in 200 ml of titanium tetrachloride, and the temperature thereof was elevated to 90° C., and then maintained at 90° C. under stirring for 45 minutes to effect reaction. After the completion of the reaction for 45 minutes, a solid portion was recovered again by hot filtration. The recovered solid portion was sufficiently washed with decane and heptane at 100° C. until a free titanium compound was no longer detected in the washing solution.

Thus, the solid titanium catalyst component (α28) which was prepared in the above procedure was stored as a decane slurry. An aliquot portion of the slurry was picked and dried to examine the catalyst composition.

The composition of the thus obtained solid titanium catalyst component (α28) was such that titanium was 3.2 mass %, magnesium was 17 mass %, chlorine was 60 mass %, an ethanol residue of 0.7 mass %, diisobutyl cyclohexane-1,2-dicarboxylate was 14.6 mass %, and 2-isobutyl-2-isopropyl-1,3-dimethoxypropane was 3.5 mass %.

(Polymerization)

In the same manner as in Example 26 except that the solid titanium catalyst component (α28) was used, the propylene polymerization was carried out. The results were shown in Table 2.

TABLE 2

(large paricle size type, each doner)

| | | Activity kg-PP/ g-Cat | MFR g/10 min | Content of Decane-insoluble components wt % | Bulk specific Gravity g/ml | Mw/Mn | Mz/Mw | Al/Ti m.r. |
|---|---|---|---|---|---|---|---|---|
| Ex. 14 | Diethyl cyclohexane-1,2-dicarboxylate (trans-isomer: 33%) | 20.6 | 6.8 | 94.9 | 0.42 | 13.7 | 4.7 | 125 |
| Ex. 15 | Diethyl cyclohexane-1,2-dicarboxylate (trans-isomer) | 20.8 | 4.7 | 96.5 | 0.39 | 6.6 | 4.6 | 125 |
| Ex. 16 | Di-n-octyl cyclohexane-1,2-dicarboxylate (trans-isomer: 29%) | 27.0 | 7.8 | 95.3 | 0.43 | 6.9 | 5.1 | 125 |
| Ex. 17 | Diisobutyl cyclohexane-1,2-dicarboxylate (trans-isomer) | 29.8 | 4.6 | 97.0 | 0.42 | 6.9 | 4.9 | 125 |
| Ex. 18 | Diethyl 4-cyclohexene-1,2-dicarboxylate (trans-isomer: 50%) | 11.5 | 6.9 | 96.1 | 0.44 | 10.1 | 5.7 | 125 |
| Ex. 19 | Diethyl 4-cyclohexene-1,2-dicarboxylate (trans-isomer) | 13.2 | 4.6 | 97.2 | 0.41 | 7.6 | 4.7 | 125 |
| Ex. 20 | Diethyl 4-cyclohexene-1,2-dicarboxylate (trans-isomer) (0.125 mol/Mg - 1 mol) | 21.5 | 5.7 | 97.1 | 0.42 | 11.5 | 4.7 | 125 |
| Ex. 21 | Diisobutyl 4-cyclohexene-1,2-dicarboxylate (trans-isomer) | 22.5 | 6.8 | 96.5 | 0.42 | 10.3 | 5.4 | 125 |
| Ex. 22 | Di-n-octyl 4-cyclohexene-1,2-dicarboxylate (cis-isomer) | 19.7 | 9.2 | 93.2 | 0.42 | 6.5 | 6.0 | 125 |
| Ex. 23 | Di-n-octyl 4-cyclohexene-1,2-dicarboxylate (trans-isomer: 50%) | 26.0 | 7.8 | 95.2 | 0.43 | 8.1 | 4.8 | 125 |
| Ex. 24 | Diisobutyl cyclopentane-1,2-dicarboxylate (trans-isomer) | 22.2 | 12.5 | 95.5 | 0.50 | 7.3 | 5.7 | 125 |
| Ex. 25 | Diisobutyl cycloheptane-1,2-dicarboxylate (trans-isomer) | 17.4 | 10.5 | 96.1 | 0.48 | 7.9 | 5.3 | 125 |
| Ex. 26 | 2-Isobutyl-2-isopropyl-1,3-dimethoxypropane, diethyl 4-cyclohexene-1,2-dicarboxylate (trans-isomer) | 13.7 | 6.0 | 98.4 | 0.44 | 7.0 | 4.8 | 125 |
| Ex. 27 | Diisobutyl phthalate, diisobutyl cyclohexane-1,2-dicarboxylate (trans-isomer) | 23.1 | 5.6 | 97.7 | 0.46 | 7.4 | 5.0 | 125 |
| Ex. 28 | 2-Isobutyl-2-isopropyl-1,3-dimethoxypropane, diisobutyl cyclohexane-1,2-dicarboxylate (trans-isomer: 78%) | 33.2 | 6.0 | 98.2 | 0.40 | 7.0 | 5.1 | 125 |

It can be seen that polypropylene obtained by using the process for producing an olefin polymer of the invention is a polymer having a broad molecular weight distribution. In particular, it is characterized that when comparing the PP's (polypropylene) having almost the same MFR values with each other, the Mz/Mw values are high, which shows high contents of the high molecular weight components.

It can be further seen that polypropylene obtained by using the solid titanium catalyst component of the invention is a polymer having a broad molecular weight distribution. In particular, it is characterized that when comparing the PP's having almost the same MFR values with each other, the Mz/Mw values are high, which shows high contents of the high molecular weight components.

Example 29

Production of Solid Titanium Catalyst Component (α29)

75 g of anhydrous magnesium chloride, 280.3 g of decane and 308.3 g of 2-ethylhexyl alcohol were reacted under heating at 130° C. for 3 hours to obtain a homogeneous solution, to which 17.7 g of ethyl benzoate was added, and mixed under stirring at 100° C. for 1 hour.

The thus obtained homogeneous solution was cooled to room temperature, and 30 ml of the homogeneous solution was wholly dropwise introduced to 80 ml of titanium tetrachloride which was maintained at −20° C. over 45 minutes under stirring to obtain a mixed solution. After completion of introduction, the temperature of the mixed solution was elevated to 97.5° C. over 3.8 hours. When the temperature reached 97.5° C., diisobutyl cyclohexane-1,2-dicarboxylate (ratio of trans-isomer: 78%) was added to the mixed solution in a proportion of 0.25 mol-fold relative to 1 mol of an Mg atom, and maintained at the same temperature for 2 hours under stirring to effect the reaction. After the completion of the reaction for 2 hours, a solid portion was recovered by hot filtration. This solid portion was resuspended in 100 ml of titanium tetrachloride, and again reacted under heating at 97.5° C. for 2 hours. After the completion of the reaction, a solid portion was recovered again by hot filtration. The recovered solid portion was sufficiently washed with decane and hexane at 100° C. until a free titanium compound was no longer detected in the washing solution. The obtained solid titanium catalyst component (α29) which was prepared in the above procedure was stored as a decane slurry, and an aliquot portion of the slurry was picked and dried to examine the catalyst composition. The composition of the thus obtained solid titanium catalyst component (α29) was such that titanium was 2.6 mass %, magnesium was 18 mass %, chlorine was 55 mass %, diisobutyl cyclohexane-1,2-dicarboxylate was 15.9 mass %, and a 2-ethylhexyl alcohol residue of 0.3 mass %.

(Polymerization)

To a polymerization vessel with an internal volume of 2 liters, 500 g of propylene and 1 NL of hydrogen were added at room temperature, and then 0.5 mmol of triethylaluminum, 0.1 mmol of diethylaminotriethoxysilane and 0.004 mmol, in terms of titanium atom, of the solid titanium catalyst component (α29) were added thereto, and the internal temperature of the polymerization vessel was rapidly elevated to 70° C. At this time, the internal pressure of the polymerization vessel was 3.1 MPa (gauge pressure) (absolute pressure: 3.2 MPa). After polymerization at 70° C. for 1 hour, a small amount of methanol was added thereto to stop the reaction, and propylene was purged. The obtained polymer particles were dried under reduced pressure overnight at 80° C.

The activity of the catalyst, and the MFR, the content of the decane-insoluble components, the bulk specific gravity, and the molecular weight distribution (Mw/Mn, Mz/Mw) of the obtained polymer were shown in Table 3.

Example 30

In the same manner as in Example 29 except that 7.5 NL of hydrogen was used upon polymerization, the propylene polymerization was carried out. At this time, the internal pressure of the polymerization vessel was 3.7 MPa (absolute pressure: 3.8 MPa).

The results of the polymerization were shown in Table 3.

TABLE 3

(U doner, small particle size)

| | Activity kg-PP/ g-Cat | MFR g/10 min | Content of decane-insoluble components wt % | Bulk specific gravity g/ml | Mw/ Mn | Mz/ Mw | Al/Ti m.r. |
|---|---|---|---|---|---|---|---|
| Ex. 29 | 16.9 | 10.5 | 98.4 | 0.45 | 7.9 | 5.8 | 125 |
| Ex. 30 | 26.2 | 170 | 98.4 | 0.45 | 7.6 | 4.6 | 125 |

From the results, it is found that a polymer having a broad molecular weight distribution can be obtained even in the presence of a nitrogen-containing alkoxysilane compound.

Example 31

Production of Solid Titanium Catalyst Component (α31)

In the same manner as in Example 17 except that diisobutyl cyclohexane-1,2-dicarboxylate (trans-isomer: 78%) was used instead of the trans-isomer of diisobutyl cyclohexane-1,2-dicarboxylate, a solid titanium catalyst component (α31) was obtained.

(Polymerization)

In the same manner as in Example 14 except that the solid titanium catalyst component (α31) was used instead of the solid titanium catalyst component (α14), the propylene polymerization was carried out. The results were shown in Table 4.

Example 32

Production of Solid Titanium Catalyst Component (α32)

In the same manner as in Example 17 except that diisobutyl cyclohexane-1,2-dicarboxylate (trans-isomer: 55%) was used instead of the trans-isomer of diisobutyl cyclohexane-1,2-dicarboxylate, a solid titanium catalyst component (α32) was obtained.

(Polymerization)

In the same manner as in Example 14 except that the solid titanium catalyst component (α32) was used instead of the solid titanium catalyst component (α14), the propylene polymerization was carried out. The results were shown in Table 4.

Example 33

Production of Solid Titanium Catalyst Component (α33)

In the same manner as in Example 17 except that a cis-isomer of diisobutyl cyclohexane-1,2-dicarboxylate was used instead of the trans-isomer of diisobutyl cyclohexane-1,2-dicarboxylate, a solid titanium catalyst component (α33) was obtained.

(Polymerization)

In the same manner as in Example 14 except that the solid titanium catalyst component (α33) was used instead of the solid titanium catalyst component (α14), the propylene polymerization was carried out. The results were shown in Table 4.

Example 34

Production of Solid Titanium Catalyst Component (α34)

First, in the same manner as in Example 14, 2.8 mol of ethanol was coordinated to 1 mol of magnesium chloride to obtain a solid adduct.

46.2 mmol of the solid adduct, in terms of magnesium atom, which was suspended in 30 ml of decane, was wholly introduced to 200 ml of titanium tetrachloride which was maintained at −20° C., under stirring. The temperature of the mixed solution was elevated to 80° C. over 5 hours. When the temperature reached 80° C., diisobutyl cyclohexane-1,2-dicarboxylate (trans-isomer) was added thereto in a proportion of 0.175 mol, based on 1 mol of magnesium atom in the solid adduct, and then the temperature thereof was elevated to 100° C. over 20 minutes. The temperature thereof was maintained at 100° C. over 90 minutes under stirring to effect the reaction.

After the completion of the reaction for 90 minutes, a solid portion was recovered by hot filtration. This solid portion was resuspended in 200 ml of titanium tetrachloride, and the temperature thereof was elevated to 100° C., and then maintained at 100° C. under stirring for 45 minutes to effect reaction. After the completion of the reaction for 45 minutes, a solid portion was recovered again by hot filtration. The recovered solid portion was sufficiently washed with decane and heptane at 100° C. until a free titanium compound was no longer detected in the washing solution to obtain a solid titanium catalyst component (α34).

(Polymerization)

In the same manner as in Example 14 except that the solid titanium catalyst component (α34) was used instead of the solid titanium catalyst component (α14), the propylene polymerization was carried out. The results were shown in Table 4.

Example 35

Production of Solid Titanium Catalyst Component (α35)

In the same manner as in Example 34 except that diisobutyl cyclohexane-1,2-dicarboxylate (trans-isomer: 78%) was used instead of the trans-isomer of diisobutyl cyclohexane-1,2-dicarboxylate, a solid titanium catalyst component (α35) was obtained.

(Polymerization)

In the same manner as in Example 14 except that the solid titanium catalyst component (α35) was used instead of the solid titanium catalyst component (α14), the propylene polymerization was carried out. The results were shown in Table 4.

Example 36

Production of Solid Titanium Catalyst Component (α36)

In the same manner as in Example 17 except that diisobutyl cyclohexane-1,2-dicarboxylate (trans-isomer: 55%) was used instead of the trans-isomer of diisobutyl cyclohexane-1,2-dicarboxylate, a solid titanium catalyst component (α36) was obtained.

(Polymerization)

In the same manner as in Example 14 except that the solid titanium catalyst component (α36) was used instead of the solid titanium catalyst component (α14), the propylene polymerization was carried out. The results were shown in Table 4.

Example 37

Production of Solid Titanium Catalyst Component (α37)

In the same manner as in Example 17 except that a cis-isomer of diisobutyl cyclohexane-1,2-dicarboxylate was used instead of the trans-isomer of diisobutyl cyclohexane-1,2-dicarboxylate, a solid titanium catalyst component (α37) was obtained.

(Polymerization)

In the same manner as in Example 14 except that the solid titanium catalyst component (α37) was used instead of the solid titanium catalyst component (α14), the propylene polymerization was carried out. The results were shown in Table 4.

TABLE 4

(Effects of ratio of isomer)

|  | Trans ratio/ % | Activity kg-PP/ g-Cat | MFR g/10 min | Content of decane-insoluble components wt % | Bulk specific gravity g/ml | Mw/Mn | Mz/Mw | Al/Ti m.r. |
|---|---|---|---|---|---|---|---|---|
| Ex. 17 | 100 | 29.8 | 4.6 | 97.0 | 0.42 | 6.9 | 4.9 | 125 |
| Ex. 31 | 78 | 30.0 | 6.1 | 96.5 | 0.46 | 8.5 | 4.6 | 125 |
| Ex. 32 | 55 | 26.4 | 6.6 | 96.0 | 0.40 | 8.9 | 4.6 | 125 |
| Ex. 33 | 0 | 18.6 | 14.0 | 93.2 | 0.45 | 7.0 | 4.3 | 125 |
| Ex. 34 | 100 | 35.1 | 4.0 | 97.6 | 0.44 | 7.2 | 4.9 | 125 |
| Ex. 35 | 78 | 34.6 | 4.0 | 97.4 | 0.47 | 8.1 | 5.2 | 125 |
| Ex. 36 | 55 | 30.8 | 4.3 | 96.8 | 0.40 | 8.3 | 5.1 | 125 |
| Ex. 37 | 0 | 21.2 | 12.8 | 94.2 | 0.44 | 6.9 | 4.3 | 125 |

Example 38

30 ml of the homogeneous solution of magnesium chloride obtained in Example 29 was wholly dropwise introduced to 80 ml of titanium tetrachloride which was maintained at −20° C. over 45 minutes under stirring to obtain a mixed solution. After completion of introduction, the temperature of the mixed solution was elevated to 105° C. over 3.9 hours. When the temperature reached 105° C., diisobutyl cyclohexane-1,2-dicarboxylate (ratio of trans-isomer: 78%) was added to the mixed solution in a proportion of 0.25 mol-fold relative to 1 mol of an Mg atom, and maintained at the same temperature for 2 hours under stirring to effect the reaction. After the completion of the reaction for 2 hours, a solid portion was recovered by hot filtration. This solid portion was resuspended in 100 ml of titanium tetrachloride, and again reacted under heating at 105° C. for 2 hours. After the completion of the reaction, a solid portion was recovered again by hot filtration. The recovered solid portion was sufficiently washed with decane and hexane at 100° C. until a free titanium compound was no longer detected in the washing solution to obtain a solid titanium catalyst component (α38).

(Polymerization)

In the same manner as in Example 14 except that the solid titanium catalyst component (α38) was used, the propylene polymerization was carried out. At this time, the internal pressure of the polymerization vessel was 3.1 MPa (gauge pressure) (absolute pressure: 3.2 MPa). The results were shown in Table 5.

Example 39

30 ml of the homogeneous solution of magnesium chloride obtained in Example 29 was wholly dropwise introduced to 80 ml of titanium tetrachloride which was maintained at −20° C. over 45 minutes under stirring to obtain a mixed solution. After completion of introduction, the temperature of the mixed solution was elevated to 100° C. over 3.9 hours. When the temperature reached 100° C., diisobutyl cyclohexane-1,2-dicarboxylate (ratio of trans-isomer: 78%) was added to the mixed solution in a proportion of 0.25 mol-fold relative to 1 mol of an Mg atom, and maintained at the same temperature for 2 hours under stirring to effect the reaction. After the completion of the reaction for 2 hours, a solid portion was recovered by hot filtration. This solid portion was resuspended in 100 ml of titanium tetrachloride, and again reacted under heating at 100° C. for 2 hours. After the completion of the reaction, a solid portion was recovered again by hot filtration. The recovered solid portion was sufficiently washed with decane and hexane at 100° C. until a free titanium compound was no longer detected in the washing solution to obtain a solid titanium catalyst component (α39).

(Polymerization)

In the same manner as in Example 14 except that the solid titanium catalyst component (α39) was used, the propylene polymerization was carried out. At this time, the internal pressure of the polymerization vessel was 3.1 MPa (gauge pressure) (absolute pressure: 3.2 MPa). The results were shown in Table 5.

Example 40

Polymerization

In the same manner as in Example 14 except that the solid titanium catalyst component (α29) obtained in Example 29 was used, the propylene polymerization was carried out. At this time, the internal pressure of the polymerization vessel was 3.1 MPa (gauge pressure) (absolute pressure: 3.2 MPa). The results were shown in Table 5.

TABLE 5

(Effects of reaction temperature of Ti)

| | Temperature for synthesis of catalyst | Activity kg-PP/g-Cat | MFR g/10 min | Content of decane-insoluble components wt % | Bulk specific gravity g/ml | Mw/Mn | Mz/Mw | Al/Ti m.r. |
|---|---|---|---|---|---|---|---|---|
| Ex. 17 | 110 | 20.4 | 4.0 | 97.2 | 0.42 | 8.2 | 6.2 | 125 |
| Ex. 38 | 105 | 26.3 | 4.3 | 97.6 | 0.46 | 7.6 | 4.8 | 125 |
| Ex. 39 | 100 | 26.4 | 5.9 | 97.6 | 0.41 | 7.7 | 4.6 | 125 |
| Ex. 40 | 97.5 | 24.4 | 4.0 | 98.3 | 0.44 | 7.6 | 4.5 | 125 |

From the results, it is found that by producing the solid titanium catalyst component of the invention at a temperature of 105° C. or lower, the broad molecular weight distribution of the obtained polymer can be highly compatibilized with the activity of the catalyst and the high stereoregularity of the obtained polymer.

Example 41

Polymerization

To a polymerization vessel with an internal volume of 2 liters, 400 g of propylene, 2.3 NL of ethylene and 1 NL of hydrogen were added at room temperature, and then 0.5 mmol of triethylaluminum, 0.15 mmol of dicyclopentyldimethoxysilane and 0.002 mmol, in terms of titanium atom, of the solid titanium catalyst component (α29) as prepared in Example 29 were added thereto, and the internal temperature of the polymerization vessel was rapidly elevated to 70° C. At this time, the internal pressure of the polymerization vessel was 3.0 MPa (gauge pressure) (absolute pressure: 3.1 MPa). After polymerization at 70° C. for 30 minutes, a small amount of methanol was added thereto to stop the reaction, and propylene was purged. The obtained polymer particles were dried under reduced pressure overnight at 80° C.

The activity of the catalyst, and the MFR, the content of the decane-insoluble components, the bulk specific gravity, the molecular weight distribution (Mw/Mn, Mz/Mw), melting point (Tm) and crystallization temperature (Tc) of the obtained polymer were shown in Table 6.

TABLE 6

(random PP)

|  | Activity kg-PP/ g-Cat | MFR g/10 min | Content of decane-insoluble components wt % | Bulk specific gravity g/ml | Mw/Mn | Mz/Mw | Tm/ °C. | Tc/ °C. | Al/Ti m.r. |
|---|---|---|---|---|---|---|---|---|---|
| Ex. 41 | 23.1 | 4.0 | 94.5 | 0.43 | 8.2 | 4.7 | 145.5 | 100.1 | 250 |

Example 42

Polymerization

To a polymerization vessel with an internal volume of 1 liter, 4-methyl-1-pentene (boiling point under normal pressure: 54° C.) and 0.5 NL of hydrogen were added at room temperature, and then 0.8 mmol of triethylaluminum, 0.08 mmol of cyclohexylmethyldimethoxysilane and 0.0075 mmol, in terms of titanium atom, of the solid titanium catalyst component (α29) as prepared in Example 29 were added thereto, and the internal temperature of the polymerization vessel was rapidly elevated to 50° C. At this time, the internal pressure of the polymerization vessel was 0.1 MPa (gauge pressure) (absolute pressure: 0.2 MPa). After polymerization at 50° C. for 1 hour, a small amount of methanol was added thereto to stop the reaction. The obtained white solid were dried under reduced pressure overnight at 80° C. The weight of the white solid was 56.8 g.

The activity of the catalyst, and the MFR, the bulk specific gravity and the molecular weight distribution (Mw/Mn, Mz/Mw) of the obtained polymer were shown in Table 7.

TABLE 7

(4MP-1 polymerization)

|  | Activity mmolTi | MFR g/10 min | Mw/Mn | Mz/Mw | Al/Ti m.r. |
|---|---|---|---|---|---|
| Ex. 42 | 8.0 | 30.0 | 7.5 | 4.8 | 106.7 |

As shown in Tables 6 and 7, when the process for polymerizing an olefin of the invention is used, various olefin polymers or olefin copolymers having broad molecular weight distributions can be obtained.

Example 43

Production of Solid Titanium Catalyst Component (α4)

In the same manner as in Example 1, 2.8 mol of ethanol was coordinated to 1 mol of magnesium chloride to obtain a solid adduct.

46.2 mmol of the solid adduct, in terms of magnesium atom, which was suspended in 30 ml of decane, was wholly introduced into 200 ml of titanium tetrachloride which was maintained at −20° C., under stirring. The temperature of the mixed solution was elevated to 80° C. over 4 hours. When the temperature reached 80° C., diisobutyl cyclohexane-1,2-dicarboxylate (trans-isomer: 78%) was added thereto in a proportion of 0.175 mol, based on 1 mol of magnesium atom in the solid adduct, and then the temperature thereof was elevated to 100° C. over 20 minutes. The temperature was maintained at 100° C. under stirring for 65 minutes to effect the reaction.

After the completion of the reaction for 65 minutes, a solid portion was recovered by hot filtration. This solid portion was resuspended in 200 ml of titanium tetrachloride, and the temperature thereof was elevated to 100° C., and then maintained at that temperature under stirring for 15 minutes to effect reaction. After the completion of the reaction for 15 minutes, a solid portion was recovered again by hot filtration. The recovered solid portion was sufficiently washed with decane and heptane at 100° C. until a free titanium compound was no longer detected in the washing solution.

Thus, the solid titanium catalyst component (α43) which was prepared in the above procedure was stored as a decane slurry. An aliquot portion of the slurry was picked and dried to examine the catalyst composition.

The composition of thus obtained solid titanium catalyst component (α43) was such that titanium was 2.8 mass %, magnesium was 18 mass %, chlorine was 61 mass %, an ethanol residue was 0.3 mass %, and diisobutyl cyclohexane-1,2-dicarboxylate was 14.3 mass %.

(Polymerization)

0.25 mmol of triethyl aluminum, 0.05 mmol of cyclohexylmethyldimethoxysilane, and 0.004 mmol, in terms of titanium atom, of the solid titanium catalyst component (α43) were added to 7 ml of purified heptane and they were stirred for 5 minutes.

In addition, to a polymerization vessel with an internal volume of 2 liters, 500 g of propylene and 1 NL of hydrogen were added at room temperature, and then above-mentioned catalyst slurry was wholly added thereto, and the internal temperature of the polymerization vessel was rapidly elevated to 70° C. At this time, the internal pressure of the polymerization vessel was 3.1 MPa (gauge pressure) (absolute pressure: 3.2 MPa). After polymerization at 70° C. for 1 hour, a small amount of methanol was added thereto to stop the reaction, and propylene was purged. The obtained polymer particles were dried under reduced pressure overnight at 80° C. The results were shown in Table 8.

Example 44

In the same manner as in Example 43 except that 0.5 mmol of triethylaluminum and 0.1 mmol of cyclohexylmethyldimethoxysilane were used, the propylene polymerization was carried out. The results were shown in Table 8.

Example 45

In the same manner as in Example 43 except that 1.0 mmol of triethylaluminum and 0.2 mmol of cyclohexylmethyldimethoxysilane were used, the propylene polymerization was carried out. The results were shown in Table 8.

Example 46

In the same manner as in Example 43 except that 1.2 mmol of triethylaluminum and 0.24 mmol of cyclohexylmethyldimethoxysilane were used, the propylene polymerization was carried out. The results were shown in Table 8.

Example 47

In the same manner as in Example 43 except that 1.4 mmol of triethylaluminum and 0.28 mmol of cyclohexylmethyldimethoxysilane were used, the propylene polymerization was carried out. The results were shown in Table 8.

Example 48

In the same manner as in Example 1, 2.8 mol of ethanol was coordinated to 1 mol of magnesium chloride to obtain a solid adduct.

46.2 mmol of the solid adduct, in terms of magnesium atom, which was suspended in 30 ml of decane, was wholly introduced into 200 ml of titanium tetrachloride which was maintained at −20° C., under stirring. The temperature of the mixed solution was elevated to 80° C. over 4 hours. When the temperature reached 80° C., diisobutyl 3,6-dimethylcyclohexane-1,2-dicarboxylate was added thereto in a proportion of 0.175 mol, based on 1 mol of magnesium atom in the solid adduct, and then the temperature thereof was elevated to 120° C. over 40 minutes. The temperature was maintained at 120° C. under stirring for 65 minutes to effect the reaction.

After the completion of the reaction for 65 minutes, a solid portion was recovered by hot filtration. This solid portion was resuspended in 200 ml of titanium tetrachloride, and the temperature thereof was elevated to 130° C., and then maintained at that temperature under stirring for 15 minutes to effect reaction. After the completion of the reaction for 15 minutes, a solid portion was recovered again by hot filtration. The recovered solid portion was sufficiently washed with decane and heptane at 100° C. until a free titanium compound was no longer detected in the washing solution.

Thus, the solid titanium catalyst component (α48) which was prepared in the above procedure was stored as a decane slurry. An aliquot portion of the slurry was picked and dried to examine the catalyst composition.

The composition of thus obtained solid titanium catalyst component (α48) was such that titanium was 3.3 mass %, magnesium was 18 mass %, chlorine was 58 mass %, an ethanol residue was 0.5 mass %, and diisobutyl 3,6-cyclohexane-1,2-dicarboxylate was 20.2 mass %.

(Polymerization)

To a polymerization vessel with an internal volume of 2 liters, 500 g of propylene, and 1 NL of hydrogen were added at room temperature, and then 0.25 mmol of triethylaluminum, 0.05 mmol of cyclohexylmethyldimethoxysilane and 0.004 mmol, in terms of titanium atom, of the solid titanium catalyst component (α14) were added thereto, and the internal temperature of the polymerization vessel was rapidly elevated to 70° C. At this time, the internal pressure of the polymerization vessel was 3.1 MPa (gauge pressure) (absolute pressure: 3.2 MPa). After polymerization at 70° C. for 30 minutes, a small amount of methanol was added thereto to stop the reaction, and propylene was purged. The obtained polymer particles were dried under reduced pressure overnight at 80° C.

Example 49

Polymerization

In the same manner as in Example 48 except that 0.5 mmol of triethylaluminum and 0.1 mmol of cyclohexylmethyldimethoxysilane were used, the propylene polymerization was carried out. The results were shown in Table 8.

Example 50

Polymerization

In the same manner as in Example 48 except that 1.0 mmol of triethylaluminum and 0.2 mmol of cyclohexylmethyldimethoxysilane were used, the propylene polymerization was carried out. The results were shown in Table 8.

Comparative Example 1

In the same manner as in Example 43 except that 1.6 mmol of triethylaluminum and 0.32 mmol of cyclohexylmethyldimethoxysilane were used, the propylene polymerization was carried out. The results were shown in Table 8.

Comparative Example 2

In the same manner as in Example 43 except that 2.0 mmol of triethylaluminum and 0.4 mmol of cyclohexylmethyldimethoxysilane were used, the propylene polymerization was carried out. The results were shown in Table 8.

Comparative Example 3

In the same manner as in Example 43 except that 0.02 mmol of triethylaluminum and 0.004 mmol of cyclohexylmethyldimethoxysilane were used, the propylene polymerization was carried out. The results were shown in Table 8. White powder was not obtained.

TABLE 8

| | Activity kg-PP/ g-Cat | MFR g/10 min | Content of decane-insoluble components wt % | Bulk specific gravity g/ml | Mw/ Mn | Mz/ Mw | Al/Ti m.r. |
|---|---|---|---|---|---|---|---|
| Ex. 43 | 24.3 | 4.0 | 97.7 | 0.48 | 7.8 | 3.6 | 62.5 |
| Ex. 44 | 22.5 | 4 | 97.8 | 0.49 | 7.5 | 4.0 | 125 |
| Ex. 45 | 20.5 | 3 | 98.0 | 0.50 | 8.8 | 4.5 | 250 |
| Ex. 46 | 21.2 | 4 | 98.0 | 0.49 | 7.5 | 5.0 | 300 |
| Ex. 47 | 21.1 | 3 | 98.0 | 0.50 | 8.9 | 5.5 | 350 |
| Ex. 48 | 30.3 | 5 | 97.9 | 0.46 | 14.8 | 7.4 | 62.5 |
| Ex. 49 | 29.3 | 4 | 98.0 | 0.48 | 13.4 | 12.6 | 125 |
| Ex. 50 | 29.8 | 4 | 98.1 | 0.48 | 11.8 | 8.4 | 250 |
| Comp. Ex. 1 | 20.3 | 4 | 98.1 | 0.50 | 6.5 | 4.2 | 400 |
| Comp. Ex. 2 | 18.9 | 6 | 98.0 | 0.49 | 6.6 | 3.6 | 500 |
| Comp. Ex. 3 | ~0 | — | — | — | — | — | 5 |

From above-mentioned results, it can be seen that by the catalyst for olefin polymerization of the invention and when the molar ratio of the organometal compound catalyst component (II) to titanium atom in the solid titanium catalyst component (I) is within the specific range, a polypropylene having a broad molecular weight distribution is produced. In particular, it is characterized that when comparing the PP's having almost the same MFR values with each other, the Mz/Mw values are high, which shows high contents of the high molecular weight components.

Above all, when using the solid titanium catalyst component comprising a cyclic diester compound having a substituent on the 3-position, a polymer having an extremely high Mw/Mn value is obtained. In particular, it can be seen that the polymer obtained by using the solid titanium catalyst component comprising cyclohexane-1,2-dicarboxylic acid diester (corresponding to the compound of the above-described formula (1a)) having a substituent on the 3-position and the 6-position exhibited extremely high Mw/Mn values and Mz/Mw values, and the activity of the catalyst and the stereoregularity of the obtained polymer are high.

What is claimed is:

1. A catalyst for olefin polymerization comprising:
a solid titanium catalyst component (I) comprising titanium, magnesium, halogen, and a cyclic ester compound (a), which is a cyclohexane-1,2-dicarboxylic acid diester represented by the following formula (1a):

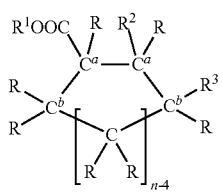

(1a)

wherein n is an integer of 6;
bonds between the carbon atoms in the cyclic backbone are all single bonds;
a plurality of $R^1$'s are each independently a monovalent hydrocarbon group having 1 to 20 carbon atoms;
a plurality of R's are each independently an atom or group selected from the group consisting of a hydrogen atom, an aliphatic hydrocarbon group having 1 to 20 carbon atoms, a halogen atom, a nitrogen-containing group, an oxygen-containing group, a phosphorus-containing group, a halogen-containing group and a silicon-containing group, and they may be bonded to each other to form a ring; and
a double bond may be contained in the backbone of the ring foamed by the bonding of R's, and in the case where two $C^a$'s bonded with $COOR^1$ are contained in the backbone of the ring, the backbone of the ring have 5 to 10 carbon atoms,
said cyclohexane-1,2-dicarboxylic acid diester having a substituent on the 3-position or having substituents on the 3-position and the 6-position, and
an organometallic compound catalyst component (II) containing a metal element selected from Groups I, II, and XIII of the periodic table, wherein
the amount of the metal (M-2) (mol) in the organometallic compound catalyst component (II) and the amount of titanium (M-Ti) (mol) in the solid titanium catalyst component (I) satisfies the following relationship:

$350>(M\text{-}2)/(M\text{-Ti})>10$.

2. The catalyst for olefin polymerization according to claim 1, wherein the amount of the metal (M-2) (mol) in the organometallic compound catalyst component (II) and the amount of titanium (M-Ti) (mol) in the solid titanium catalyst component (I) satisfies the following relationship:

$350>(M\text{-}2)/(M\text{-Ti})>50$.

3. The catalyst for olefin polymerization according to claim 1, further comprising an aromatic carboxylic acid ester and/or a compound having two or more ether linkages through a plurality of carbon atoms.

4. The catalyst for olefin polymerization according to claim 1, further comprising an electron donor (III).

5. A process for olefin polymerization, comprising polymerizing an olefin in the presence of the catalyst for olefin polymerization of claim 1.

6. A molded product obtained by molding the olefin polymer produced by the process for olefin polymerization of claim 5.

7. A process for olefin polymerization, comprising polymerizing an olefin in the presence of the catalyst for olefin polymerization of claim 2.

8. A molded product obtained by molding the olefin polymer produced by the process for olefin polymerization of claim 7.

9. A process for olefin polymerization, comprising polymerizing an olefin in the presence of the catalyst for olefin polymerization of claim 3.

10. A molded product obtained by molding the olefin polymer produced by the process for olefin polymerization of claim 9.

11. A process for olefin polymerization, comprising polymerizing an olefin in the presence of the catalyst for olefin polymerization of claim 4.

12. A molded product obtained by molding the olefin polymer produced by the process for olefin polymerization of claim 11.

13. A catalyst for olefin polymerization, comprising:
a solid titanium catalyst component (I) comprising titanium, magnesium, halogen, and a cyclic ester compound (a), which is a cyclohexane-1,2-dicarboxylic acid diester represented by the following formula (1a):

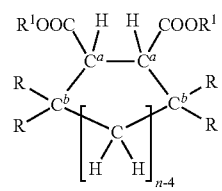

(1a)

wherein n is an integer of 6;
bonds between the carbon atoms in the cyclic backbone are all single bonds;
a plurality of $R^1$'s are each independently a monovalent hydrocarbon group having 1 to 20 carbon atoms; and
a plurality of R's are each a hydrogen atom,
said cyclohexane-1,2-dicarboxylic acid diester having a purity of the trans-isomers of 51 to 79%, and
an organometallic compound catalyst component (II) containing a metal element selected from Groups I, II and XIII of the periodic table, wherein
the amount of the metal (M-2) (mol) in the organometallic compound catalyst component (II) and the amount of titanium (M-Ti) (mol) in the solid titanium catalyst component (I) satisfies the following relationship:

$350 \geq (M\text{-}2)/(M\text{-Ti}) \geq 10$.

14. A process for olefin polymerization, comprising polymerizing an olefin in the presence of the catalyst for olefin polymerization of claim 13.

15. A molded product obtained by molding the olefin polymer produced by the process for olefin polymerization of claim 14.

* * * * *

UNITED STATES PATENT AND TRADEMARK OFFICE
CERTIFICATE OF CORRECTION

PATENT NO. : 7,888,438 B2
APPLICATION NO. : 11/878739
DATED : February 15, 2011
INVENTOR(S) : Kazuhisa Matsunaga et al.

It is certified that error appears in the above-identified patent and that said Letters Patent is hereby corrected as shown below:

At column 49, lines 13-24, replace formula (1a) with the following formula (1a):

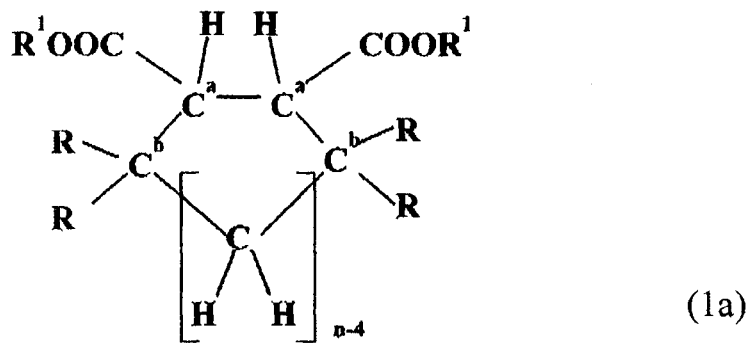

(1a)

Signed and Sealed this
Second Day of August, 2011

David J. Kappos
*Director of the United States Patent and Trademark Office*